US008624891B2

(12) United States Patent
Bowles et al.

(10) Patent No.: US 8,624,891 B2
(45) Date of Patent: Jan. 7, 2014

(54) ITERATIVE REPROJECTION OF IMAGES

(75) Inventors: Huw Bowles, Brighton (GB); Kenny Mitchell, Addlestone (GB); Robert Sumner, Zurich (CH); Wojciech Jarosz, Zurich (CH); Markus Gross, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 417 days.

(21) Appl. No.: 13/007,968

(22) Filed: Jan. 17, 2011

(65) Prior Publication Data

US 2012/0182299 A1 Jul. 19, 2012

(51) Int. Cl.
G06T 15/00 (2011.01)
G06T 15/50 (2011.01)
G06T 15/60 (2006.01)

(52) U.S. Cl.
USPC .......................................... 345/419; 345/426

(58) Field of Classification Search
USPC .................................. 345/419, 426
See application file for complete search history.

(56) References Cited

U.S. PATENT DOCUMENTS

| | | | | | |
|---|---|---|---|---|---|
| 6,084,908 | A | * | 7/2000 | Chiang et al. | 375/240.03 |
| 6,636,212 | B1 | * | 10/2003 | Zhu | 345/421 |
| 7,254,265 | B2 | * | 8/2007 | Naske et al. | 382/154 |
| 7,551,770 | B2 | * | 6/2009 | Harman | 382/154 |
| 7,573,475 | B2 | * | 8/2009 | Sullivan et al. | 345/427 |
| 8,180,145 | B2 | * | 5/2012 | Wu et al. | 382/154 |
| 2011/0002532 | A1 | * | 1/2011 | Frakes et al. | 382/154 |
| 2012/0176368 | A1 | * | 7/2012 | Genova | 345/419 |
| 2012/0176473 | A1 | * | 7/2012 | Genova et al. | 348/46 |

OTHER PUBLICATIONS

Huw Bowles, "Efficient Real-Time Stereoscopic3D Rendering", MS Thesis, Aug. 2010.*
Chen M., Lu W., Chen Q., Ruchala K. J., Oliverag. H.: A simple fixed-point approach to invert a deformation field. Medical Physics 35, 1 (2008), 81-88. 2, 6.*
Leonard McMillan Jr., "An Image-Based Approach to Three-Dimensional Computer Graphics", dissertation of Ph.D, University of North Carolina at Chapel Hill.*
S.Zinger, L.Do, Y.Gao, P.H.N.de With," Conversion of free-viewpoint 3DTV signals for stereo displays", Multimedia and Expo (ICME), 2010 IEEE International Conference on Jul. 19-23, 2010.*
Chih-Cheng Wei, Chin-Hsing Chen, Jin-Yuan Wang, "A Closed-Form Solution for Image Warping of Mesh in Quad-Tree Representation", 2007 International Conference on Advanced Information Technologies (AIT).*

(Continued)

Primary Examiner — Ryan R Yang
Assistant Examiner — Jin Ge
(74) Attorney, Agent, or Firm — Patterson & Sheridan, LLP

(57) ABSTRACT

Techniques are disclosed for performing image space reprojection iteratively. An insignificant parallax threshold depth is computed for a source image. Portions of the image having depth values greater than the insignificant parallax threshold depth may be shifted uniformly to produce corresponding portions of the reprojection (target) image. An iterative fixed-point reprojection algorithm is used to reproject the portions of the source image having depth values less than or equal to the insignificant parallax threshold depth. The fixed point reprojection algorithm quickly converges on the best pixel in the source image for each pixel in a target image representing an offset view of the source image. An additional rendering pass is employed to fill disoccluded regions of the target image, where the reprojection algorithm fails to converge.

29 Claims, 14 Drawing Sheets

(56) References Cited

OTHER PUBLICATIONS

N. Herodotou, A. N. Venetsanopoulos, "Temporal prediction of video sequences using an image warping technique based on color segmentation", Image Analysis and Processing Lecture Notes in Computer Science vol. 1310, 1997, pp. 494-501.*

Marcato R.: Optimizing an Inverse Warper. Masters thesis, Massachusetts Institute of Technology, 1998.*

Akenine-Moller, et al., "Stochastic Rasterization Using Time-Continuous Triangles"., Proceedings of the 22nd ACM SIGGRAPH/EUROGRAPHICS Symposium on Graphics Hardware (2007) pp. 7-16.

Andreev, Dmitry "Real-Time Frame Rate Up-Conversion for Video Games or how to get from 30 to 60 fps for free". ACM SIGGRAPH 2010 talks, Jul. 25-29, 2010 1 page.

Chen, et al., "View Interpolation for Image Synthesis". Proceedings of the 20th Annual Conference on Computer Graphics and Interactive Techniques, ACM 1993 New York, NY, pp. 279-288.

Cook, et al., "Distributed Ray Tracing". ACM SIGGRAPH Computer Graphics vol. 18, No. 3, Jul. 1984 pp. 137-145.

Didyk, et al., "Adaptive Image-Space Stereo View Synthesis". Vision, Modeling and Visualization Workshop, 2010 pp. 1-8.

Fatahalian, et al., "Reducing Shading on GPUs Using Quad-Fragment Merging". ACM Transactions on Graphics (TOG) 29, 4, Article 67 (Jul. 2010), 8 pages.

Marcato, Jr., Robert W., "Optimizing an Inverse Warper". MIT, May 22, 1998 51 pages.

Mark, et al., "Post-Rendering 3D Warping". Proceedings of the 1997 Symposium on Interactive 3D Graphics—SI3D '97, ACM Press, New York, NY No., Figure 2, 7-ff, 10 pages.

McGuire, et al., "Real-Tim Stochastic Rasterization on Conventional GPU Architectures"., High Performance Graphics 2010, The Eurographics Association, 10 pages.

McMillan, Jr., Leonard, "An Image-Based Approach to Three-Dimensional Computer Graphics"., A Dissertation, Dept. of Computer Science, University of North Carolina (Chapel Hill), 1997, 209 pages.

Nehab, et al., "Accelerating Real-Time Shading with Reverse Reporjection Caching". Proceedings of the 22nd ACM SIGGRAPH/EUROGRAPCICS Symosium on Graphics Hardware, 2007, 11 pages.

Reshetov, Alexander, "Morphological Antialiasing"., Proceedings of the 1st ACM Conference on High Performance Graphics—HPG, '09, 8 pages.

Schobel, et al., "No Title". AAA Stereo-3D in CryENGINE 3 in GDC10, 33 pages. http://www.crytek.com/cryengine/presentations/aaa-stereo-d3-in-cryengine-3.

Torborg, et al., "Talisman: Commodity Realtime 3D Graphics for the PC". ACM 1996, Annual Conference on Computer Graphics, 11 pages.

Walter, et al., "Interactive Rendering Using the Render Cache". Proceedings of the 10th Eurographics Workshop on rendering, 10, 1999, pp. 235-246.

Walter, et al., "Enhancing and Optimizing the Render Cache". Proceedings of the 13th Eurographics Workshop on Rendering (2002) pp. 37-43.

Zwicker, et al., "A Survey and Classification of Real Time Rendering Methods". Mitsubishi Electric Research Laboratories, Cambridge Research Center. Mar. 2000, 40 pages. http://www.merl.com/papers/tr2000-09/(last accessed Apr. 2004).

* cited by examiner

ITERATIVE REPROJECTION OF IMAGES

BACKGROUND

1. Field of the Invention

Embodiments of the present invention relate to the field of computer graphics and, in particular, to the reprojection of image data.

2. Description of the Related Art

In order to generate a second image based on a first image that is viewed from a different position, the first image may be reprojected in image space using an image offset. Image space reprojection may be used to produce stereoscopic image pairs, where a first image in each pair is viewed by the left eye and the second image in each pair is viewed by the right eye to produce images that appear to the viewer to be three-dimensional. An alternative to image space reprojection would be to render both images in the stereographic pair. However, rendering both images in real-time is not typically possible for graphics applications that require high-performance processing to render a single image in real-time.

More recently, image space reprojection algorithms known as depth-image-based rendering (DIBR) have been developed. However, these image space reprojection computations are quite complex and time-consuming to execute and have not been successfully performed in real-time during the rendering of three-dimensional content. Additionally, the DIBR techniques are unable to properly handle disocclusion regions where a portion of a background in the rendered scene is revealed (unoccluded) in the reprojected image.

SUMMARY

Embodiments of the invention provide techniques for performing image space reprojection iteratively. An insignificant parallax threshold depth is computed for an image. Portions of the image having depth values greater than the insignificant parallax threshold depth may be shifted uniformly to produce corresponding portions of the reprojection (target) image. An iterative fixed-point reprojection algorithm is used to reproject the portions of the source image having depth values less than or equal to the insignificant parallax threshold depth. The fixed point reprojection algorithm converges on the best pixel in the source image for each pixel in a target image representing an offset view of the source image. An additional rendering pass is employed to fill disoccluded regions of the target image where the reprojection algorithm fails to converge. In addition to generating stereoscopic pairs in real-time, the iterative fixed-point reprojection algorithm may also be applied to other near view-computation problems, such as depth of field, motion blur, and multiview point rendering (e.g., for auto-stereoscopic displays). The iterative fixed-point reprojection algorithm may be implemented in a single reprojection pass and for application in other areas of spatio-temporal rendering, such as 30-60 Hz conversion for split/second and lightfield rendering. Additionally, one or more reprojections may be combined to produce an image that is reprojected in time and/or image space.

One embodiment of the invention includes a method for reprojecting a source image. This method may generally include receiving the source image and receiving difference information representing a difference between the source image and a target image that is a reprojection of the source image. For at least one location in the target image, a starting point in the source image determined based on the difference information. For the starting point, a processor iterates a function to generate target data for a respective location in the target image.

One embodiment of the invention includes a method of reprojecting a source image using guidance data. This method may generally include receiving source image data and receiving difference information representing an offset between the source image and a target image that is a reprojection of the source image. The source image is mapped into a set of bounding areas that represent the guidance data. A processor computes a convergence term based on the difference information for at least one of the bounding areas in the set of bounding areas.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1A:
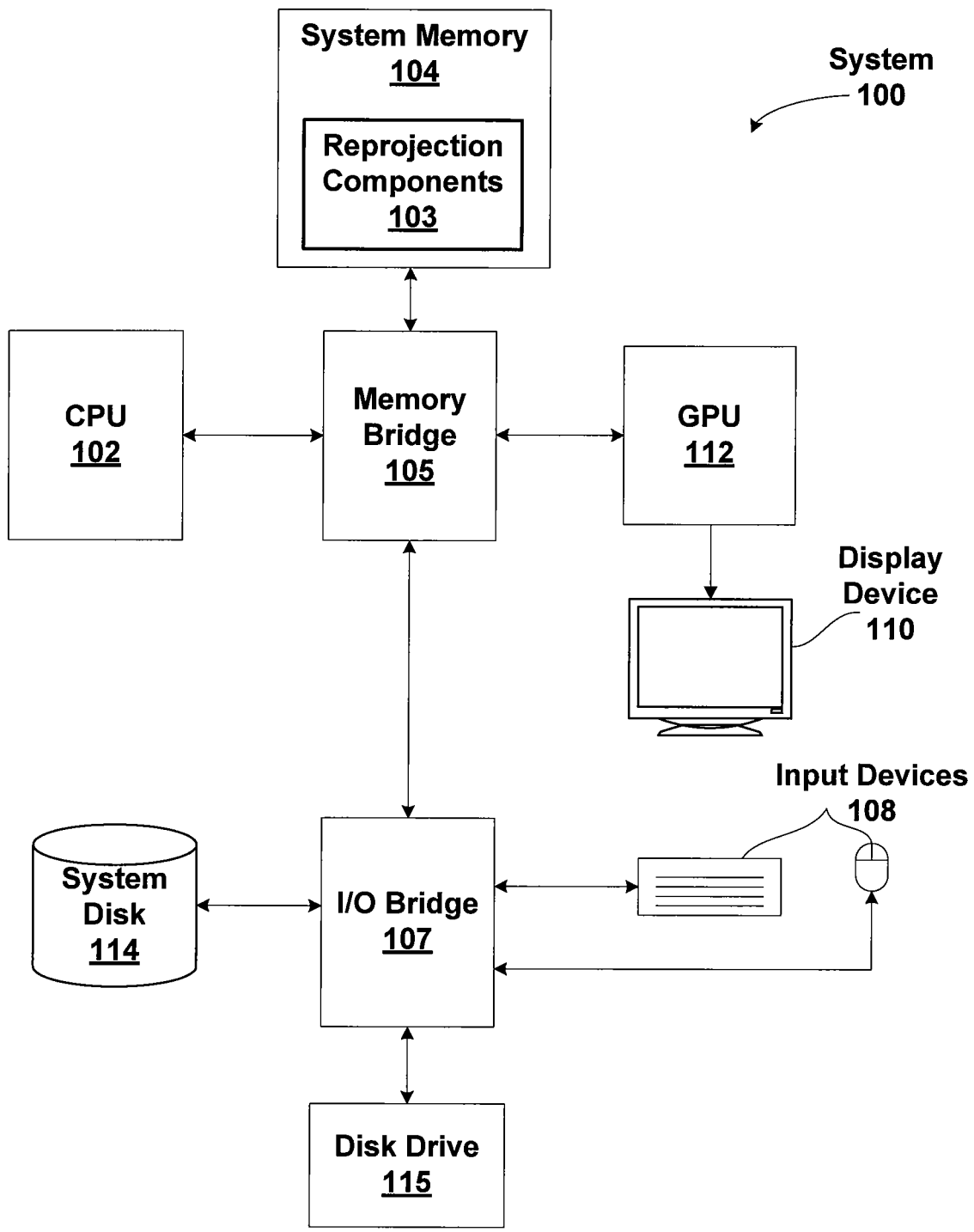
FIG. 1A is a block diagram of a system configured to implement one or more aspects of the present invention.

Embodiments of the invention provide techniques for reprojecting a source image to generate a target image based on difference information. The difference information, such as motion paths or vectors, may be used to generate a second image of a stereoscopic pair, converting frame rates (30-60 Hz split/second), rendering lightfields, performing depth of field, motion blur, and multiview point rendering. The reprojection algorithm relies on a fixed point iteration to quickly converge on a pixel in the source image that corresponds to a pixel in the target image. In order to reproject images in real-time, an insignificant parallax threshold value is computed and is used to generate portions of the target image corresponding to pixels in the source image that have depth values greater than the insignificant parallax threshold value by applying a uniform shift to the corresponding pixels in the source image.

The source image may be divided into bounding areas, where each bounding area is subdivided to produce levels of increasing detail. In one embodiment, a bounding area is a bounding box that is aligned to the x and y axes. However, other shapes and alignments may be used for the bounding areas. The resulting set of bounding boxes may be represented as a tree or hierarchical structure that provides guidance data. The structure may be adaptively traversed to optimize execution of the reprojection algorithm by iterating within bounding boxes where differences are present, according to the difference information. In order to determine target pixel values corresponding to pixels that are occluded in the source image and revealed (disoccluded) in the target image due to movement of a foreground object, a final rendering pass is performed to "fill" holes in the target image resulting from disocclusion. When combined with the adaptive traversal of the tree structure, a high quality reprojected target image may be generated in real-time.

One embodiment of the invention provides a computer-implemented method for reprojecting a source image. The method includes receiving the source image and difference information representing a difference between the source image and a target image that is a reprojection of the source image. For at least one location in the target image, a starting point in the source image determined based on the difference information. For the starting point, a processor iterates a function to generate target data for a respective location in the target image.

One embodiment of the invention provides a computer-implemented method for reprojecting a source image using guidance data. This method includes receiving source image data and difference information representing an offset between the source image and a target image that is a reprojection of the source image. The source image is mapped into a set of bounding areas that represent the guidance data. A processor computes a convergence term based on the difference information for at least one of the bounding areas in the set of bounding areas.

System Overview

FIG. 1A is a diagram illustrating an example system 100 for animation generation and/or animation playback. The system 100 may be configured to generate animation sequences including reprojected images in real-time or for playback. The system 100 may also be configured to execute a game and to generate reprojected images during execution of the game. The system 100 is further configured to accept and process input from a user and to provide data for displaying the results of such user input.

The user inputs commands using input devices 108. The input devices 108 may be any device that allows the user to interact with the system 100. For example, the input device 108 may comprise a keyboard, a joystick, a controller, a microphone, a camera, a keypad, or a series of buttons, among other devices and features. The system 100 outputs graphics and animations to a display device 110, the display device 110 may be any device that receives data for display and presents it visually to the user. For example, the display device 110 may include a cathode ray tube, a plurality of light emitting diodes (LEDs), a liquid crystal display (LCD), a portable video game console, or a projector, among other devices and features.

The system 100 includes a central processing unit (CPU) 102 that is in communication with the input devices 108 through an input/output (I/O) bridge 107. The CPU 102 communicates with a graphics processing unit (GPU) 112 through a memory bridge 105 to generate images that are output to the display device 110. In some embodiments, one or more of the GPU 112, CPU 102, I/O bridge 107, and memory bridge 105 are integrated into a single device. The system 100 may further include a system memory 104 in communication with the CPU 102 through the memory bridge 105. The CPU 102 is configured to retrieve and execute programming instructions stored in the system memory 104 and system disk 114. Similarly, the CPU 102 is configured to store and retrieve application data residing in the system memory 104 and system disk 114.

The system memory 104 may comprise certain types of random access memory (RAM) such as dynamic random access memory (DRAM) or static random access memory (SRAM), or may comprise any other type of volatile memory. The volatile memory 104 may be used to store data and/or instructions during operation of the CPU 102. In particular, the system memory 104 may store reprojection components 103 that are used to generate sequences of images that include reprojected images. In other embodiments the reprojection components 103 are stored in the system disk 114. Those skilled in the art will recognize other types of memory and uses thereof.

The system 100 may further include a non-volatile system disk 114 that is in communication with the CPU 102 through the I/O bridge 107 and memory bridge 105. The system disk 114 may include flash memory, magnetic storage devices, hard disks, or read-only memory (ROM) such as erasable programmable read-only memory (EPROM), or any other type of non-volatile memory. The system disk 114 may be used to store games, instructions, character information, game status information, or any other information that is to be retained if power to the system 100 is removed. The system 100 may comprise an interface to install or temporarily locate additional non-volatile memory. Those skilled in the art will recognize other types of non-volatile memory and uses thereof.

The GPU 112 is configured to render data supplied by the CPU 102 for display on the display device 110. The GPU 112 may be configured to perform any number of functions related to providing data for display on the display device 110. For example, the GPU 112 may be configured to render a plurality of polygons, apply shading or texture, create data representative of a three-dimensional environment, or convert between coordinate spaces, among other functions. In particular, the GPU 112 may be configured to generate additional images by reprojecting rendered image data based on difference data. Those skilled in the art will recognize other configurations and functionalities of the GPU 112. An advantage of generating the additional images using reprojection is that the additional images are not rendered from the polygons used to compose each additional image.

The system 100 may further include a disc drive 115 in communication with the CPU 102. The CPU 102 may read data from a disc inserted into the disc drive 115. In some embodiments, the system 100 is configured to record data on the disc using the disc drive 115. In this way, data relating to animation may be transported to or from the system 100. Alternatively, animation data may be transmitted to/from system 100 via a network.

The system 100 is not limited to the devices, configurations, and functionalities described above. For example, although a single volatile memory 106, non-volatile memory 108, GPU 112, disc drive 112, input device 114, and display device 116 are illustrated, a plurality of any of these devices may be implemented internal or external to the system 100. In addition, the system 100 may comprise a power supply or a network access device. Those skilled in the art will recognize other such configurations of the system 100. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

Graphics and animations for display by the system 100 can be created using any number of methods and devices. A variety of commercially available modeling software may be used to generate graphics and animations representing a three-dimensional environment. Using such software, an animator can create objects and simulations of objects that can be used by the reprojection components 103 of the system 100 to provide data for display on the display device 110.

The reprojection components 103 may be configured to perform reprojections using an image warp. Given an source image I, the image warp is a vector field $V:R^2 \to R^2$ defined over I, where the vector field defines a displacement for every pixel P at source position $x_s$ in I to a respective warped position $x_w$ in a target image I*, such that $x_w = x_s + V(x_s)$. The warp field V encapsulates information about the required reprojection and may be a function of the pixel depth only (as is the case for reprojections that shift the camera orthogonally to the view direction. Alternatively, the warp field may be defined as the per-pixel velocities (as required for temporal reprojections) or formulated as some combination of pixel depth and velocity. The warp field may include motion or path vectors.

The equation $x_w = x_s + V(x_s)$ corresponds to the forward mapping formulation. The reverse mapping formulation defines the warp in terms of the warped positions: $x_s = x_w + V^*(x_w)$. Given V*, the target image may be directly generated using the reverse mapping formulation by inputting the coordinates $x_w$ of each pixel in the target view and evaluating the right hand side to yield the lookup position $x_s$ in the source view. However, in typical computer graphics situations a closed form expression for V* is not available. Typically, the available input is information from the source viewpoint (pixel colors, depths, motion data, and the like) from which the warp V may be defined for the source image pixels. Defining an inverse warp V* is more difficult since the target view is unknown. Therefore, the reprojection components 103 are configured to solve the forward mapping equation using iterative techniques. More specifically, the location of each pixel in the target image is known and fixed ($x_w$), whereas the source image location ($x_s$) is the unknown. Therefore, the forward mapping formulation is solved for $x_s$.

Figure 1B:
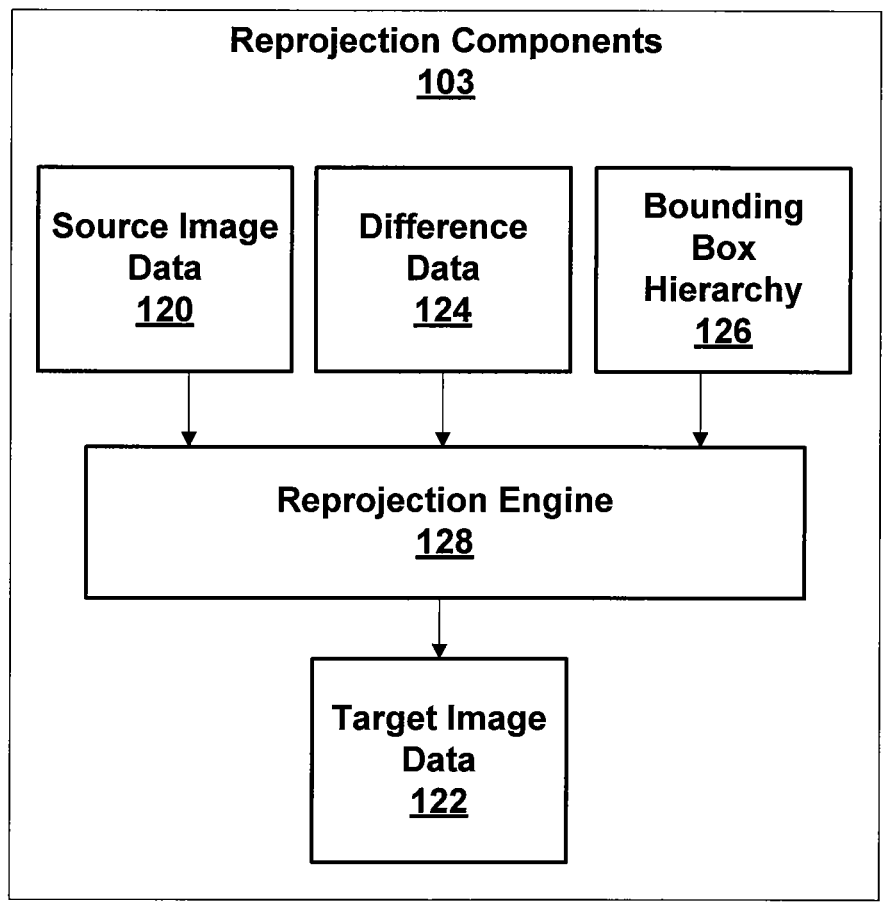
FIG. 1B is a block diagram of the reprojection components of FIG. 1A that are configured to implement one or more aspects of the present invention.

FIG. 1B is a block diagram of the reprojection components of FIG. 1A that are configured to implement one or more aspects of the present invention. The reprojection components 103 comprises a reprojection engine 128 including instructions or data that can be used to reproject images. In particular, the reprojection engine 128 may be configured to reproject images by applying fixed point iteration based on difference data. Inputs to the reprojection engine 128 may include source image data 120, difference data 124, and bounding box hierarchy 126. When the reprojection engine 128 is executed by the CPU 102 and/or GPU 112, target image data 122 is generated. The source image data 120 and target image data 122 may represent a sequence of frames and may be stored in the system memory 104 or dedicated graphics memory associated with the GPU 112.

The source image data 120 may comprise hand-drawn 2D images or images rendered from 3D graphics data. The difference data 124 may be difference information including optical flow data representing motion in space or time of surfaces in the source image relative to the same surfaces in the target image. Examples of optical flow data include a warp field, motion vector or motion path data approximating differences in screenspace positions of one or more surfaces between the source image and the target image, and motion vector or motion path data approximating the screenspace velocity and/or acceleration of a surface as the screenspace positions of the surface changes from the source image to the target image. Optical flow data may be generated along with color and other data during the rendering process. The difference data 124 may comprise parameters that are used to perform the reprojection, such as an offset value for generating stereoscopic image pairs, for converting frame rates, and light source positions for rendering lightfields.

For temporal reprojections a time parameter may be defined to control how far into the past or future the source image is reprojected. Setting the time parameter to 0.5 will generate inbetween frames for a 30-60 Hz split/second frame rate conversion. For spatial reprojections camera translations may be specified as horizontal and vertical parameters in (u,v) coordinates. For a stereoscopic reprojections v may be set to zero and u may be a function of interoccular distance. For lightfield rendering u and v may be used to denote the horizontal and vertical positions of each camera. Spatial reprojections may also be used to perform motion blur and defocus blur effects. Finally, multiple spatio-temporal effects may be performed simultaneously by combining the image processing that generates the target image as a function of (u,v) and time (t).

The bounding box hierarchy 126 comprises a tree structure that provides guidance data for the reprojection engine 128. The bounding box hierarchy 126 may be adaptively traversed to optimize execution of the reprojection algorithm by iterating within bounding boxes, according to the difference data 124. The target image data 122 is a 2D image that is generated by the reprojection engine 128. In one embodiment, a first system is configured to transmit the source image data 120 and the difference data 124 to a second system that processes the source image data 120 and the difference data 124 to generate the target image data 122. A sequence of frames may be generated in real-time that includes the source image data 120 and the target image data 122.

Figure 2A:
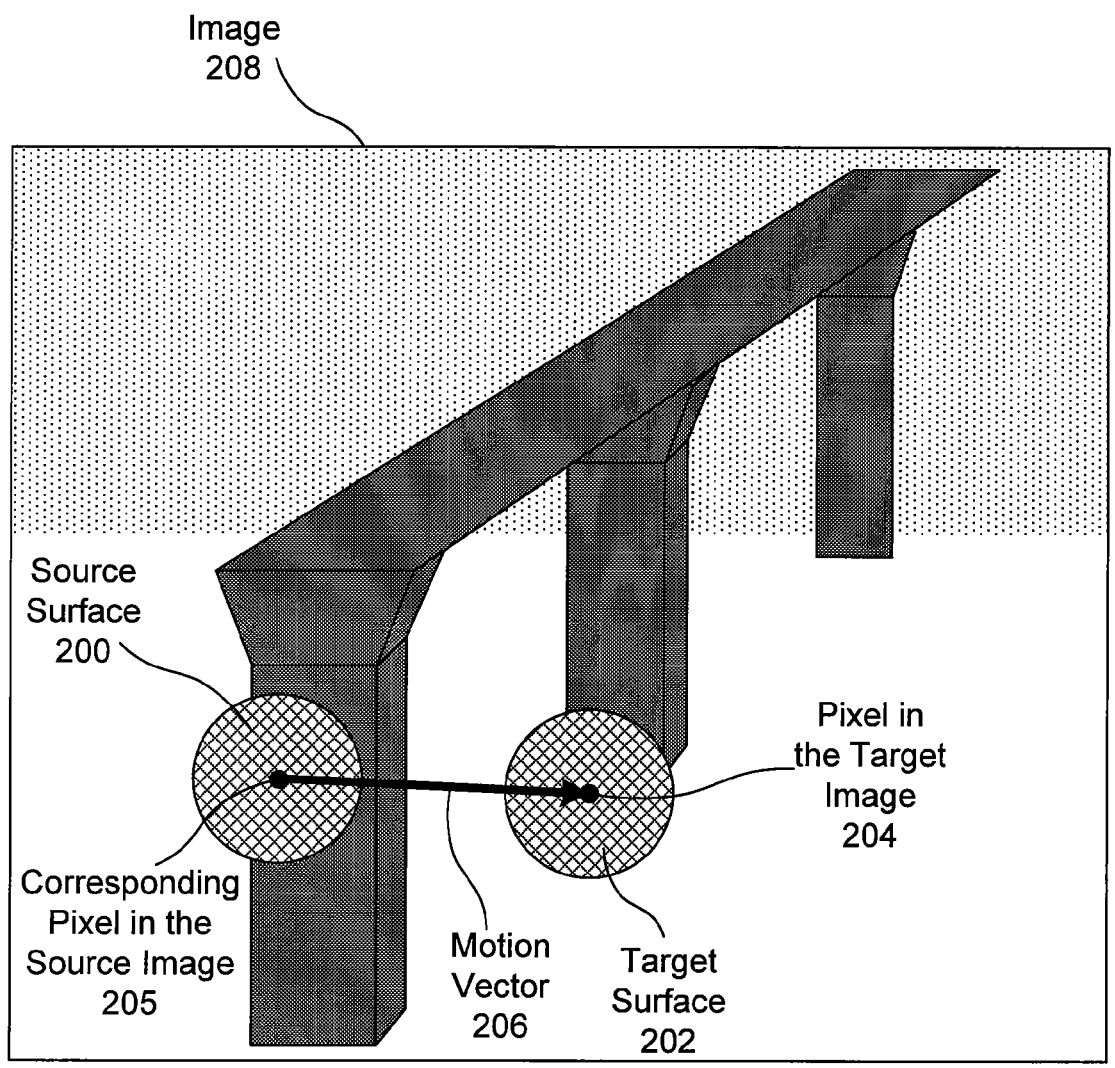
FIG. 2A illustrates an example of a source image including a source surface that is reprojected to generate a target surface, according to one embodiment of the invention.

FIG. 2A illustrates an example of an image 208 including a source surface 200 at time t that is reprojected to generate a target surface 202 at time t+1 that is also shown in image 208, according to one embodiment of the invention. Frames for time t and t+1 are overlaid in the image 208. The goal of the reprojection is to reproject a source image including the source surface 200 to approximate a target image including the target surface 202. The background objects in image 208 are stationary and appear the same in the source and target images.

The reprojection may be computed by a pixel shader that is executed by a processor, GPU 112 or CPU 102. A pixel in the source image, corresponding pixel in the source image 205, that corresponds to a pixel in the target image 204 is located. The corresponding pixel in the source image 205 provides a depth and color value for the pixel in the target image 204. The corresponding pixel in the source image 205 is located based on difference data, e.g., the motion vector 206. The motion vector 206 indicates the difference in position of the source surface 200 for the frames at time t and time t+1, and approximates the velocity of the corresponding pixel in the source image 205. In one embodiment a motion path is used instead of motion vector 206, where the motion path may be non-linear. The difference data provides a starting point for the fixed point iteration, e.g., pixel in the target image 204. When difference data is not used to determine a starting point, the position of the corresponding pixel in the source image 205 may be used as the starting point. However, the iteration may not converge or may converge to an object in the background instead of the source surface 200. In order to produce a correct result, the iteration computation needs to converge to the frontmost (nearest) surface point.

Figure 2B:
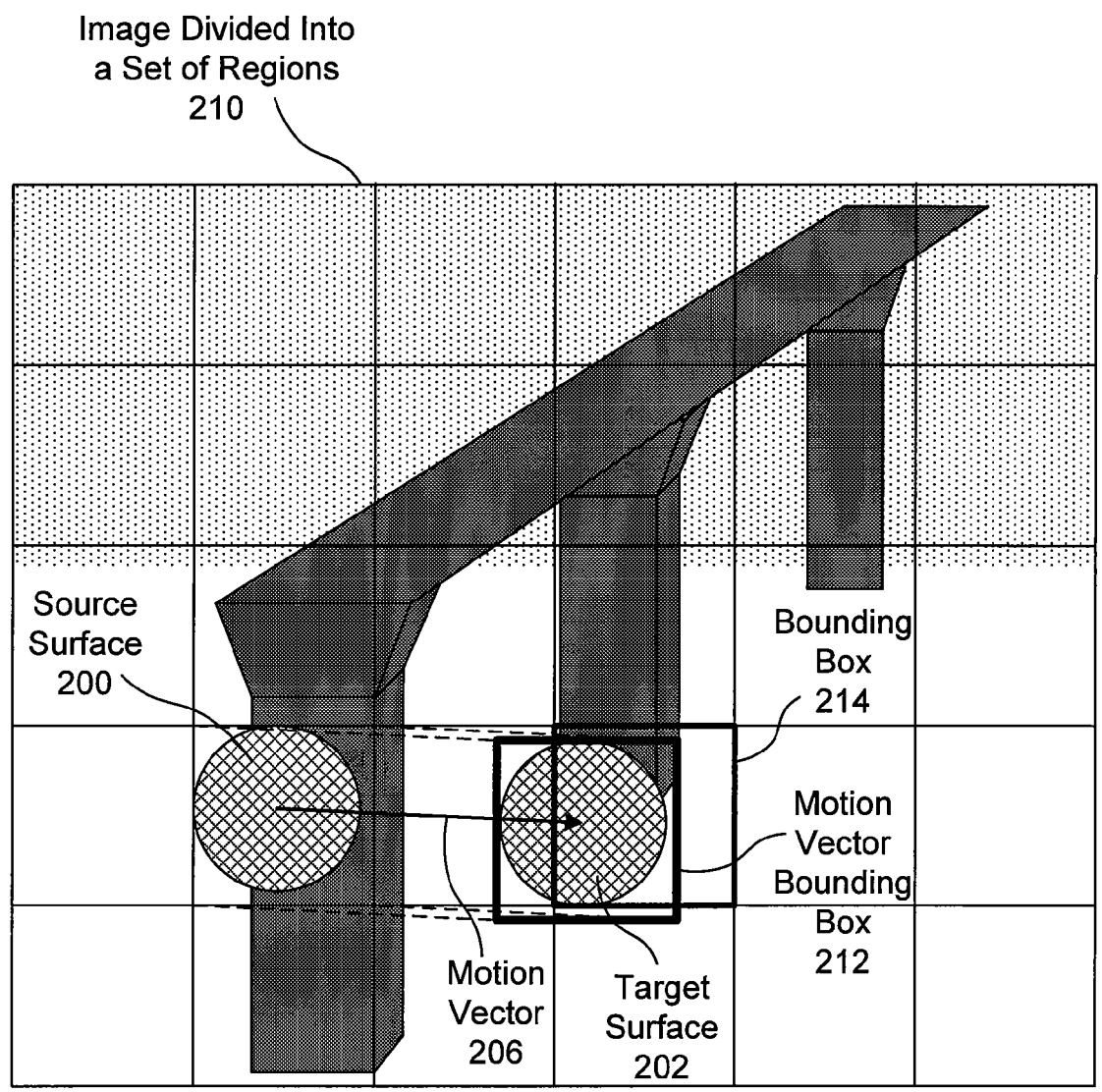
FIG. 2B illustrates bounding boxes that are intersected by the target surface of FIG. 2A, according to one embodiment of the invention.

In order to determine starting points for the reprojection, the image may be divided into a set of regions. For each region, the coordinates of the bounding box that includes the endpoints of all of the motion paths or vectors in the respective region are stored. FIG. 2B illustrates bounding boxes that are intersected by the target surface 202 of FIG. 2A, according to one embodiment of the invention. The motion vector bounding box 212 includes the endpoints of all of the motion vectors associated with the source surface 200. The bounding box 214 includes endpoints of some of the motion vectors associated with the source surface 200. Either the bounding box 214 or the motion vector bounding box 212 may be used to reproject the portion of the source surface 200 that is within each respective bounding box. More specifically, to compute the color and depth values for the pixels within the motion vector bounding box 212, the fixed point iteration uses the pixels within the bounding box where the motion vector 206 (and other motion vectors associated with the source surface 200) originate.

Fixed Point Iteration

In order to reproject images in real-time, an insignificant parallax threshold value is computed and used to generate portions of the target image corresponding to pixels in the source image that have depth values greater than the insignificant parallax threshold value by applying a uniform shift to the corresponding pixels in the source image. When moving from a source image to a target image, where the source and target images are a stereographic image pair, the size of the shift of each pixel is inversely proportional to the depth of the pixel. In other words, pixels at different depths shift in a non-uniform manner. This effect is known as motion parallax.

At a certain depth in a scene, the maximum possible relative parallax between two neighboring pixels becomes insignificant; in other words, two neighboring pixels with sufficiently large depth values shift almost uniformly. This region of the view volume may be shifted uniformly, with a bounded error, using an efficient copy operation, e.g., texture copy. Only the near part of the view volume is reprojected using the fixed point iterative reprojection technique.

The threshold depth at which the maximum possible relative parallax between two neighboring pixels becomes insignificant is the Insignificant Parallax Threshold, or IPT. An expression for the IPT may be derived and the depth value is $z_{IPT}$. Although the IPT is described assuming that a single projection matrix is used for the entire scene, the derivation of the $z_{IPT}$ may be generalised to the case where multiple projection matrices are used by modifying the inputs to correspond to each individual projective zone in the scene.

Consider a point P at coordinates $(x_w, y_w, z_w)$ in view space. When a stereoscopic image is generated using reprojection, only the x coordinate varies between two views of the scene (a left eye and right eye image pair) since they coordinate is constant. By projective geometry, the view space coordinate of point P on the focal plane is given by:

$$x_p = d \cdot \frac{x_w}{z_w} \qquad \text{(equation 1)}$$

Let the signed value of the shift of the points be equal to $\Delta x_w$. After the view shift, the new projected coordinate on the focal plane is given by:

$$x'_p = d \cdot \frac{x_w + \Delta x_w}{z_w} \qquad \text{(equation 2)}$$

The shift in projective coordinates $\Delta x_p$ is given by the difference of equations (1) and (2):

$$x'_p = d \cdot \frac{x_w + \Delta x_w}{z_w} \qquad \text{(equation 3)}$$

Now we consider two neighboring pixels, $P_1$ and $P_2$, with shifts given by $\Delta x_{p1}$ and $\Delta x_{p2}$ respectively. Let $\delta$ denote the difference of the parallax shifts of the two pixels:

$$\delta = \Delta x_{p2} - \Delta x_{p1} \qquad \text{(equation 4)}$$

A bound $\epsilon$ may be established on the difference $\delta$ in shift between $P_1$ and $P_2$:

$$|\delta| \le \epsilon \qquad \text{(equation 5)}$$

It is useful to defines $\epsilon$ in units of pixels (instead of view space units). The following equation may be used to perform the required conversion:

$$|\delta| < \frac{2}{S_h} \cdot \varepsilon \quad \text{(equation 6)}$$

Expanding $\delta$:

$$|\Delta x_{p2} - \Delta x_{p1}| < \frac{2\varepsilon}{S_h} \quad \text{(equation 7)}$$

$$\left| d \cdot \frac{\Delta x_w}{z_{w2}} - d \cdot \frac{\Delta x_w}{z_{w1}} \right| < \frac{2\varepsilon}{S_h} \quad \text{(equation 8)}$$

Rearranging Terms:

$$\left| \frac{1}{z_{w2}} - \frac{1}{z_{w1}} \right| < \frac{2\varepsilon}{S_h d \Delta x_w} \quad \text{(equation 9)}$$

Since no assertions have been made on the ordering of the two pixels, the following may be asserted without loss in generality:

$$z_{w2} < z_{w1} \quad \text{(equation 10)}$$

Further, matters may be simplified by assigning:

$$z_{w1} = z_{far} \quad \text{(equation 11)}$$

By making this assertion, one of the pixels out of the pair is at the very back of the scene, and therefore the maximum possible relative shift error will be evident. This is appropriate for generic scenes. On the other hand, if the maximum depth differential is known to be bounded based on the structure of the scene, a smaller depth differential may be used instead, which would in turn reduce the size of the error and allow more of the scene to be shifted uniformly.

Equations (10) and (11) allow the equation to be simplified to the following:

$$\frac{1}{z_{w2}} - \frac{1}{z_{far}} < \frac{2\varepsilon}{S_h d \Delta x_w} \quad \text{(equation 12)}$$

Rearranging Terms:

$$\frac{1}{z_{w2}} < \frac{2\varepsilon}{S_h d \Delta x_w} + \frac{1}{z_{far}} \quad \text{(equation 13)}$$

$$z_{w2} \geq \frac{S_h d \Delta x_w z_{far}}{2\varepsilon z_{far} + S_h \Delta x_w d} = z_{IPT} \quad \text{(equation 14)}$$

This formulation (equation 14) is useful because $z_{far}$ can be provided, and specify the maximum error $\epsilon$ that may be tolerated, and the formula will produce a threshold depth $z_{IPT}$, beyond which all image points can be shifted uniformly.

Figure 2C:
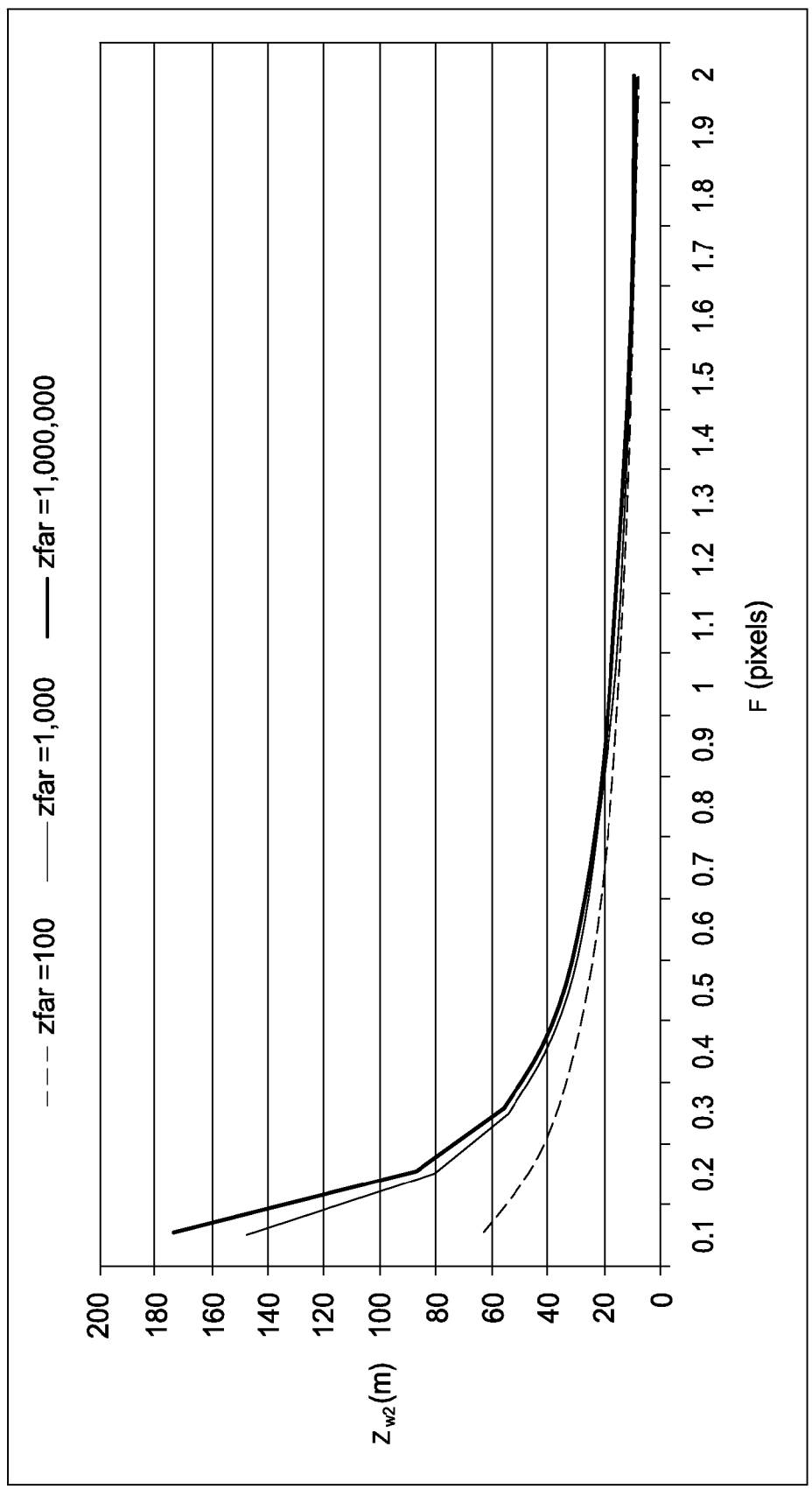
FIG. 2C illustrates a plot of distances after which approximation error is bounded by $\epsilon$, for different values of $\epsilon$, and $z_{far}$, according to one embodiment of the invention.

FIG. 2C illustrates a plot of distances after which approximation error is bounded by $\epsilon$, for different values of $\epsilon$ and $z_{far}$, according to one embodiment of the invention. This function used to compute $z_{IPT}$ has two desirable characteristics: (1) Large amounts of depth allowance may be given to the scene (i.e. large values for $z_{far}$) with minimal increase in the threshold value $z_{IPT}$. The difference in threshold values between $z_{far} = 1,000$ and $z_{far} = 1,000,000$ is very small, even for small error tolerances ($\epsilon$). (2) The threshold decreases quickly for increasing error tolerance $\epsilon$. If an error of up to 0.5 pixels may be accepted, full reprojection needs only be performed for the frontmost 30-40 m of the scene.

It is interesting to observe that even for a very deep scene, where $z_{far} = 1,000,000$, all points after $z=180$ may be shifted uniformly. Therefore, 99.98% of the scene's depth range may be shifted uniformly. Depending on the scene and the reprojection technique used, this may significantly reduce the rendering cost for the target image.

Figure 3A:
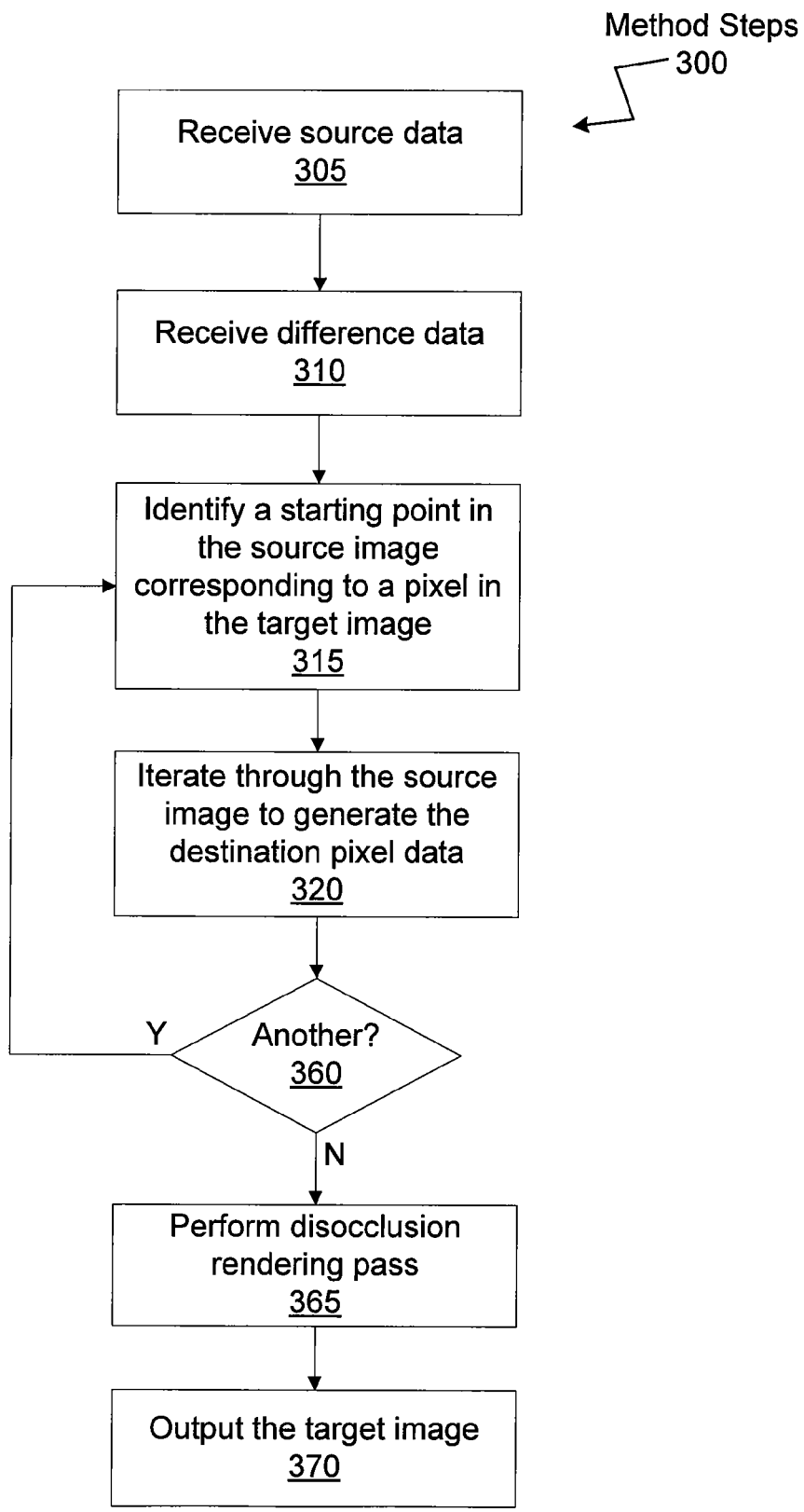
FIG. 3A is a flowchart of a method steps describing reprojection of a source image to produce a target image, according to one embodiment of the invention.

FIG. 3A is a flowchart of a method steps 300 describing reprojection of a source image to produce a target image, according to one embodiment of the invention. Persons skilled in the art would understand that, even though the method is described in conjunction with the systems of FIGS. 1A-2C, any system configured to perform the method steps, in any order, is within the scope of embodiments of the invention.

The method 300 begins at step 305, where a processing unit, such as the processing unit that executes the reprojection engine 128, receives the source image data 120. At step 310, the processing unit receives the difference data 124. At step 315, a starting point in the source image is identified using the difference data. At step 320, the reprojection engine 128 iterates through the source image to generate the destination pixel data, as further described in conjunction with FIG. 3B.

At step 360, the reprojection engine 128 determines whether data should be computed for another pixel in the target image, and, if so, steps 315 and 320 are repeated. Otherwise, at step 365, the target data has been generated and the pixel shader performs a rendering pass performs disocclusion processing. At step 370, the target image is complete and may be output by the pixel shader for display and/or stored.

Figure 3B:
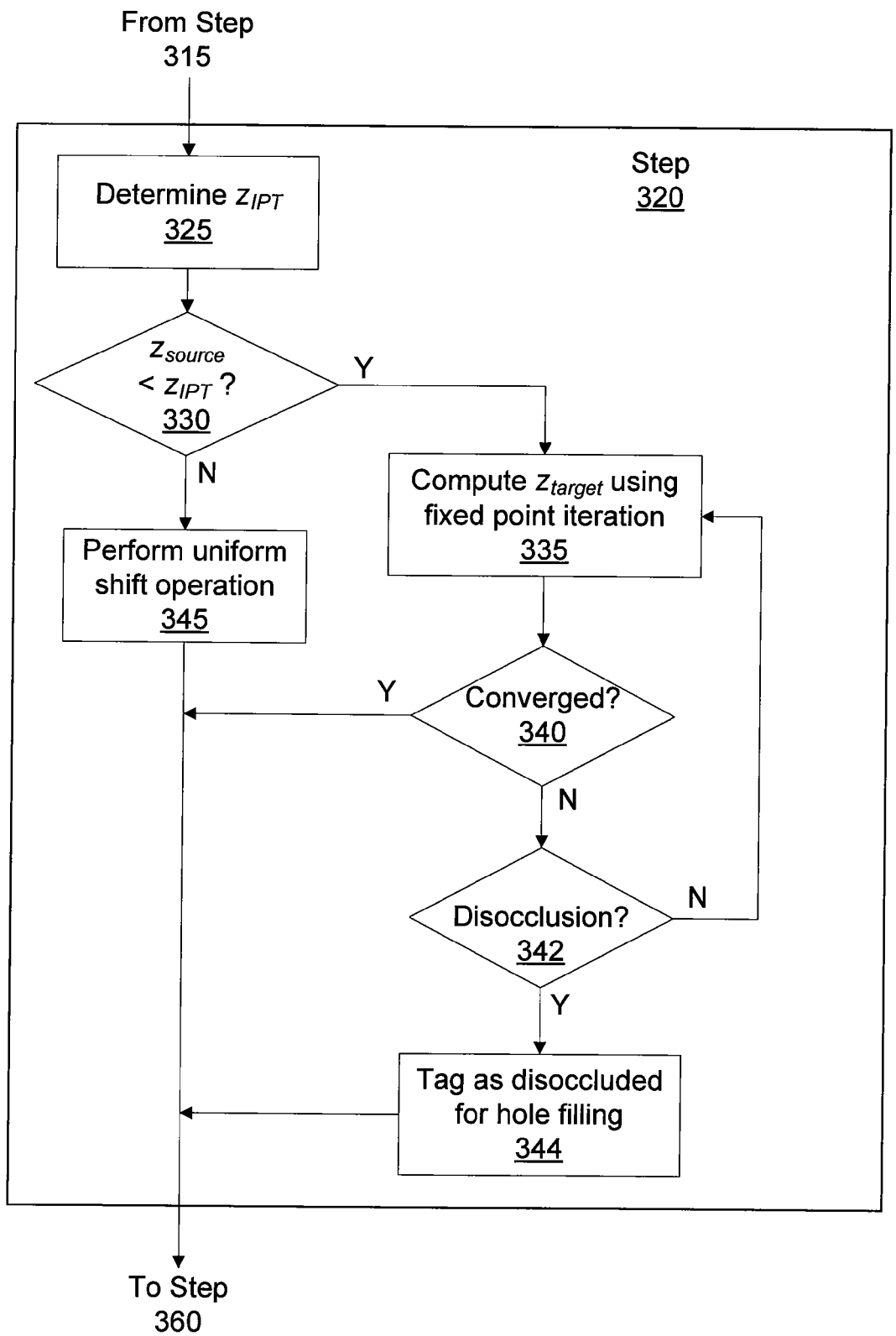
FIG. 3B is a flowchart of a method step shown in FIG. 3A, according to one embodiment of the invention.

FIG. 3B is a flowchart of a method step shown in FIG. 3A, according to one embodiment of the invention. At step 325, the reprojection engine 128 determines $z_{IPT}$ for the source image. At step 330, the reprojection engine 128 compares the z value for the corresponding pixel in the source image, $z_{source}$ with $z_{IPT}$. If the $z_{source}$ is not less than $z_{IPT}$, then, at step 345, the reprojection engine 128 performs a uniform shift operation on the corresponding pixel in the source image to produce data for the target pixel before proceeding to step 360.

If, at step 330, the reprojection engine 128 determines that the $z_{source}$ is less than $z_{IPT}$, then, at step 335, the reprojection engine 128 computes the z value for the pixel in the target image, $Z_{target}$ by performing a first iteration of the fixed point iteration. At step 340, the reprojection engine 128 determines whether the fixed point iteration converges, and, if so, the reprojection engine 128 proceeds to step 360. Otherwise, at step 342, the reprojection engine 128 determines whether the pixel in the target image corresponds to a pixel in the source image that is revealed (disoccluded) by movement of a surface. If, at step 342, the reprojection engine 128 determines that the pixel in the target image corresponds to a pixel in the source image that is not disoccluded, then the method returns to step 335 and another iteration of the fixed point iteration is performed.

If, at step 342, the reprojection engine 128 determines that the pixel in the target image corresponds to a pixel in the source image that is disoccluded, then, at step 344, the target pixel is tagged or otherwise marked as disoccluded by the reprojection engine 128 so that data for the pixel will be generated during step 370. In the case of temporal reprojection, divergent regions of the target image are situated at the trailing edge of moving objects. The target data is undefined at points that are divergent unless one or more additional input images are available that may be used to fill the holes resulting from the disocclusion. In divergent regions, the iteration computations tend to flip-flop in value across the discontinuity. The regularity of this flip-flopping behavior also tends to repeat a surrounding texture. In some cases, setting the parity of the iteration count, so that the final iteration lands on the background texture, often produces a satisfactory approximation to the correct result.

Referring back to the forward mapping equation, $x_w = x_s + V(x_s)$ is rewritten as $x_s = G(x_s)$ in order to solve for the source image locations, $x_s$, where the new function G is defined as:

$$G(x_s) = x_w - V(x_s) \qquad \text{(equation 15)}$$

The value $x_s$ that satisfies $x_s = G(x_s)$ corresponds to a fixed point of G; when $x_s$ is input to G the result is $x_s$. Fixed point interation solves equations of this form by generating a set of iterates, $x_i$, using the recurrence relation:

$$x_{i+1} = G(x_i) \qquad \text{(equation 16)}$$

When seeded with an initial value $x_0$, successive iterates are computed through repeated applications of G.

TABLE 1 illustrates example pseudocode for performing the iteration, where $x_0$ is the starting point for the iteration and $x_w$ is the location of the pixel in the target image that is being computed.

TABLE 1

Fixed Point Iteration Pseudocode

```
Procedure FixedPointIteration (Point x_w, Point x_0)
    begin
        x ← x_0
        count ← 0
        residual ← ε
        while residual ≥ ε and count < MAX_ITERS do
            x_prev ← x
            x ← x_w - V(x)
            residual ← ‖ x - x_prev ‖
            count ← count + 1
        end while
        if count < MAX_ITERS then
            return x
        else
            return 0
    end procedure
```

Two mechanisms are employed to supervise the iteration. Convergence is determined by thresholding the progress of the iteration. When the difference across iterations of the iterate x is smaller than a threshold value ε, the algorithm stops iterating. Secondly, to ensure that diverging or slowly converging cases terminate in a timely manner, a threshold MAX_ITERS may be set to limit the total iteration count.

Figure 3C:
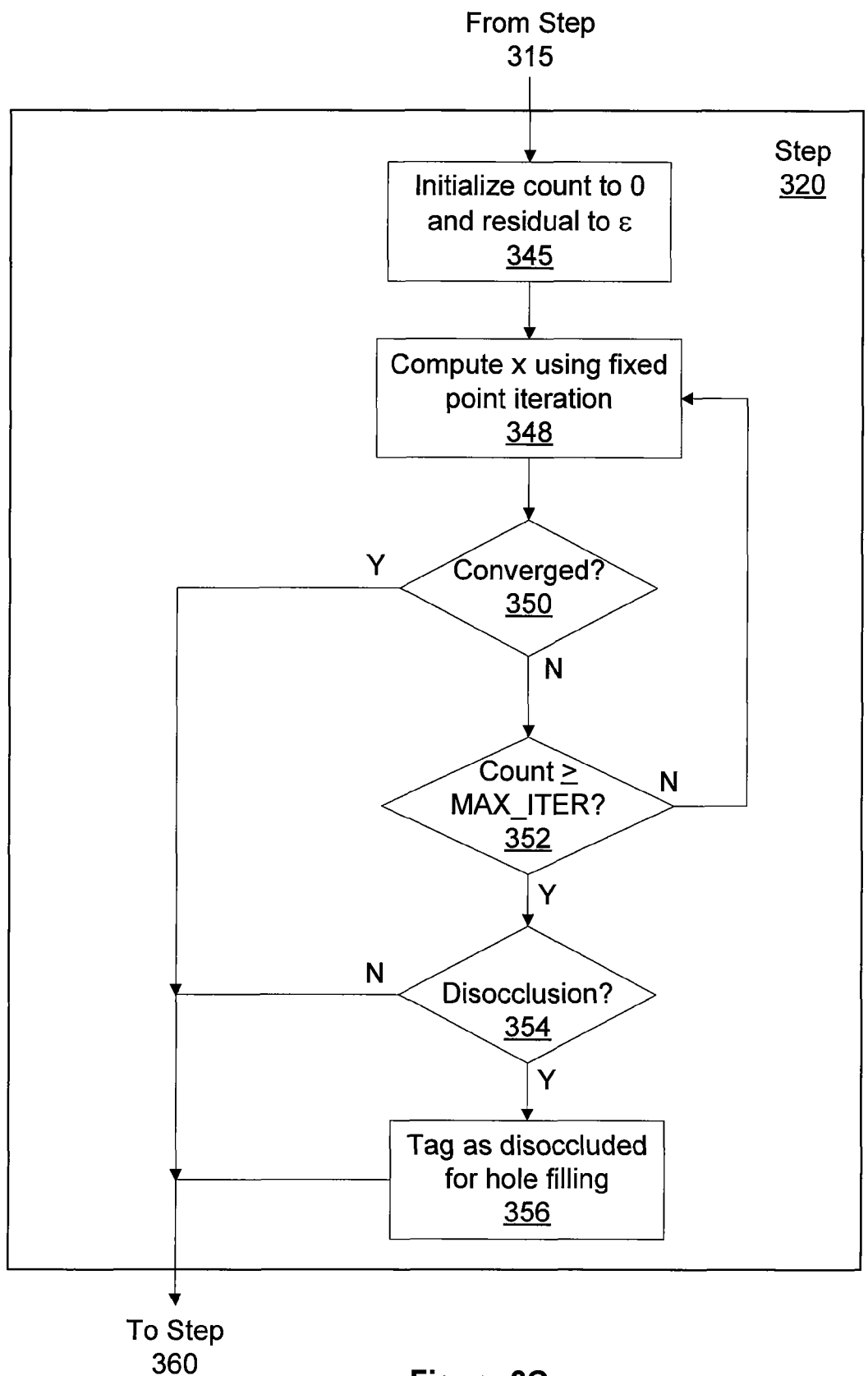
FIG. 3C is another flowchart of the method step shown in FIG. 3A, according to one embodiment of the invention.

FIG. 3C is another flowchart of the method step 320 shown in FIG. 3A, according to one embodiment of the invention. Rather than determining convergence based on $z_{IPT}$, convergence is determined based on the threshold value ε and MAX_ ITERS. At step 345, the reprojection engine 128 initializes the count to 0 and the residual to ε. At step 348, the reprojection engine 128 computes x using fixed point iteration. The reprojection engine 128 also increments the count and updates the residual by comparing the previous x ($x_{prev}$) to the computed x. At step 350, the reprojection engine 128 determines whether the fixed point iteration converges, and, if so, the reprojection engine 128 proceeds to step 360.

Otherwise, at step 352, the reprojection engine 128 determines if the count is greater than or equal to the MAX_ ITERS, and, if not, then the reprojection engine 128 returns to step 348. Otherwise, the reprojection engine 128 proceeds to step 354 and determines if the pixel in the target image corresponds to a pixel in the source image that is revealed (disoccluded) by movement of a surface. If, at step 354, the reprojection engine 128 determines that the pixel in the target image corresponds to a pixel in the source image that is not disoccluded, then the reprojection engine may set the pixel value to 0 before proceeding to step 360. If, at step 354, the reprojection engine 128 determines that the pixel in the target image corresponds to a pixel in the source image that is disoccluded, then, at step 356, the target pixel is tagged or otherwise marked as disoccluded by the reprojection engine 128 so that data for the pixel will be generated during step 370.

Guided Reprojection

Figure 4A:
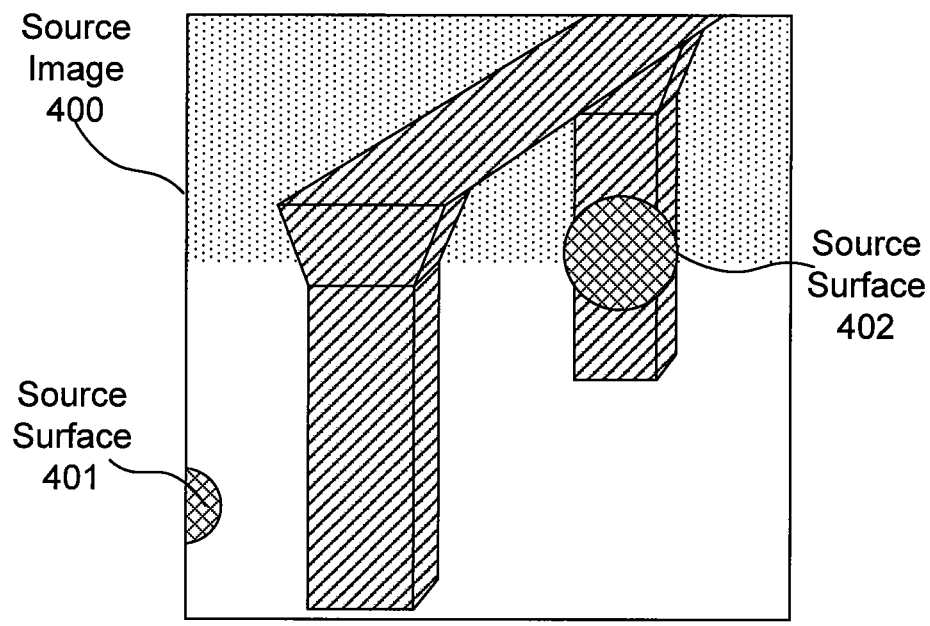
FIG. 4A is a diagram illustrating a source image, according to one embodiment of the invention.

While it is possible to generate the data for the target image by processing each pixel of the target image using the methods shown in FIGS. 3A, 3B, and 3C, some optimizations may be possible so that processing performance may be increased. FIG. 4A is a diagram illustrating a source image 400, according to one embodiment of the invention. The source image includes a source surface 401 and a source surface 402.

Figure 4B:
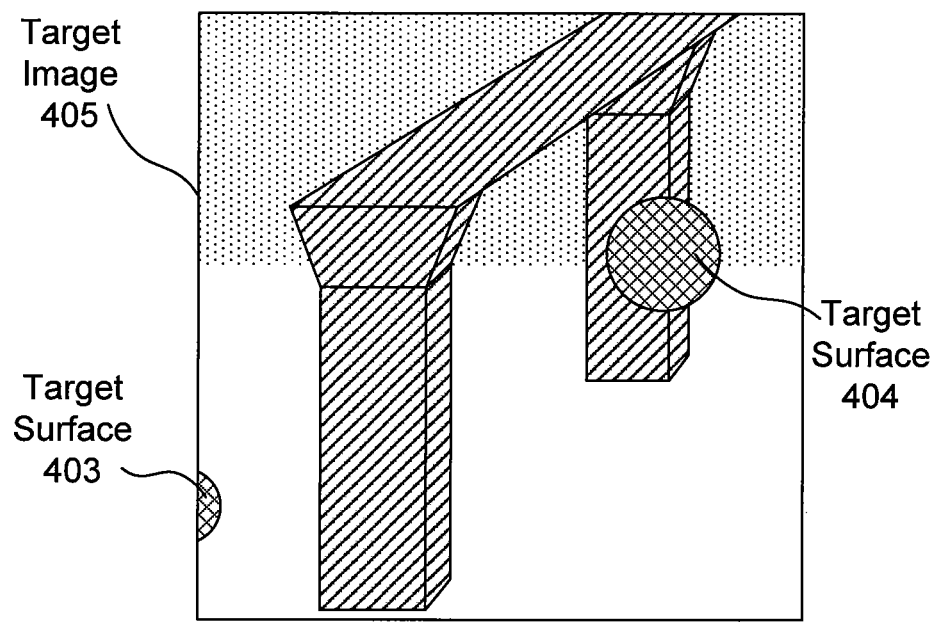
FIG. 4B is a diagram illustrating a target image that is a reprojection of the source image shown in FIG. 4A, according to one embodiment of the invention.

FIG. 4B is a diagram illustrating a target image 405 that is a reprojection of the source image 400 shown in FIG. 4A, according to one embodiment of the invention. The target image 405 includes a target surface 403 that is reprojected source surface 401. The target image 405 also includes a target surface 404 that is reprojected source surface 402. Source surface 401 moves to the left and source surface 402 moves to the right to produce the target image 405.

In order to more easily identify the particular pixel in the source image 400 that reprojects to a pixel in the target image 405, a hierarchy of bounding boxes may be constructed. The source image 400 may be divided into bounding boxes, where each box is subdivided to produce levels of increasing detail. The resulting hierarchy of bounding boxes is represented as a tree structure that provides guidance data. The tree structure may be adaptively traversed to optimize execution of the reprojection algorithm by iterating within bounding boxes where the difference data indicates that differences (or movement) are present. Each node in the tree structure is implicitly associated with the underlying pixels in the source image, and stores information about where the surfaces in the underlying source image will reproject to in the target image. More precisely, each node contains an image-space bounding box of the reprojected positions of all the underlying pixels. The tree represents a hierarchical map describing where surfaces in the source image will reproject to in the target image.

Figure 4C:
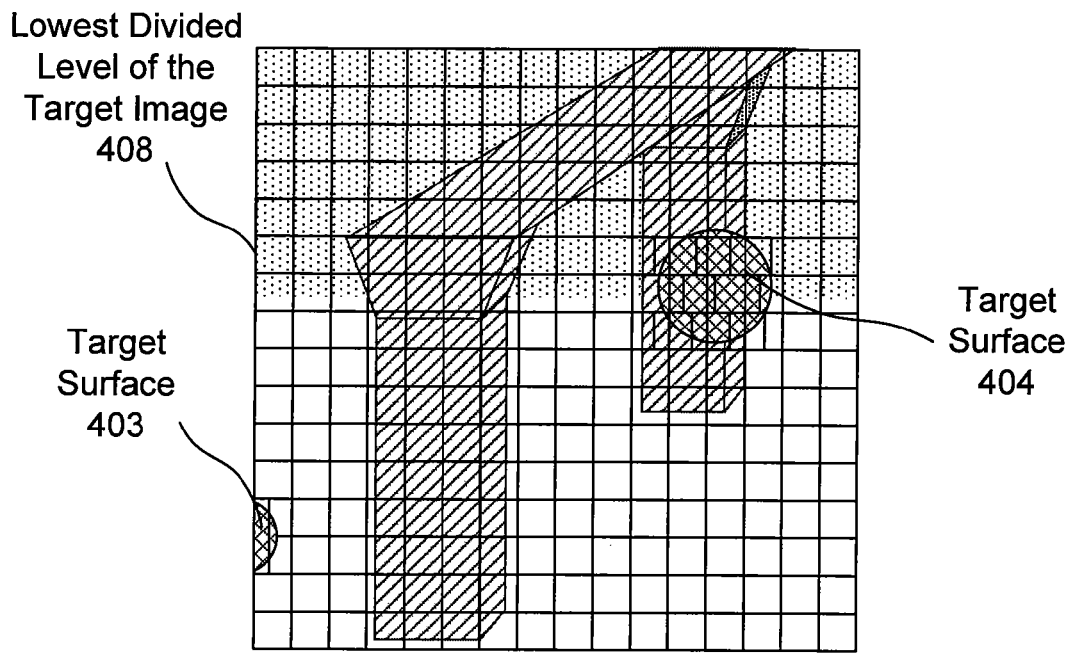
FIG. 4C is a diagram illustrating the target image shown in FIG. 4B divided into a lowest level of bounding boxes, according to one embodiment of the invention.

FIG. 4C is a diagram illustrating the target image shown in FIG. 4B divided into a lowest level of bounding boxes, according to one embodiment of the invention. Each bounding box in the lowest divided level of the target image 408 may include one or more pixels of the target image 405 and bounds the pixels where underlying motion paths or vectors (or other difference data) associated with the source image 400 originates. Most of the lowest level bounding boxes are unperturbed, i.e., do not include difference data indicating that a source surface 401 or 402 moves or is offset. However, the lowest level bounding boxes that include portions of the target surface 403 and 404 are perturbed.

Figure 4D:
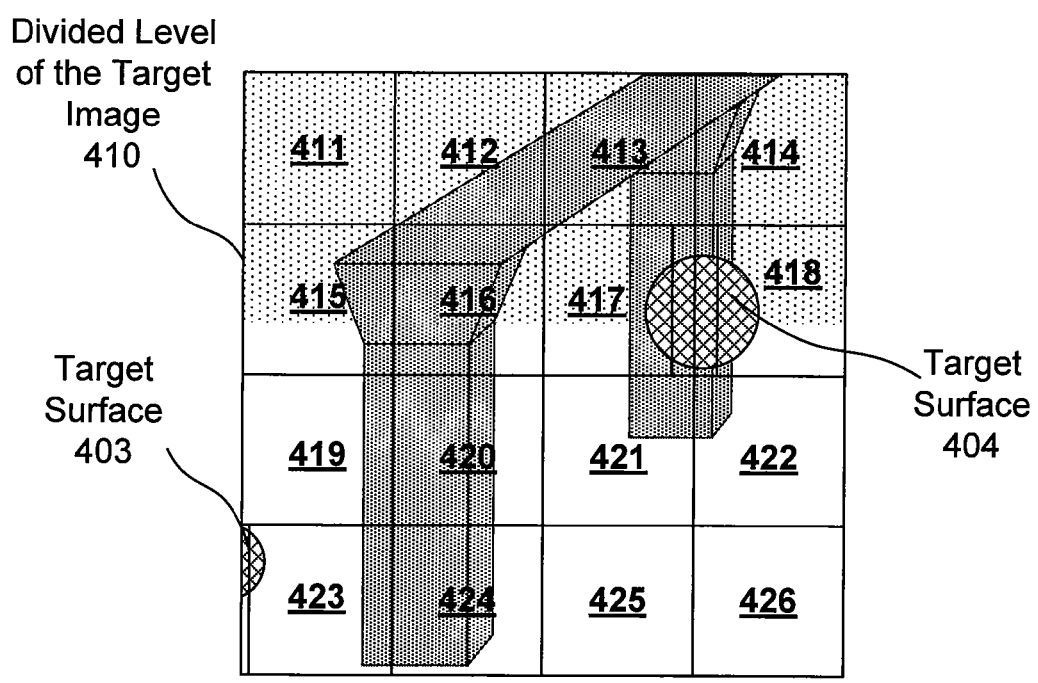
FIG. 4D is a diagram illustrating the target image shown in FIG. 4B divided into a level of bounding boxes, according to one embodiment of the invention.

At each higher level of the bounding box hierarchy, a bounding box represents the union of the underlying bounding boxes in the lower level. FIG. 4D is a diagram illustrating the target image 405 shown in FIG. 4B divided into a higher level of bounding boxes, according to one embodiment of the invention. Each bounding box 411-426 in the divided level of the target image 410 represents the union of the underlying bounding boxes. As shown, bounding boxes 417, 418 and 423 are perturbed as indicated by the misaligned vertical lines in bounding boxes 417, 418 and 423.

Figure 4E:
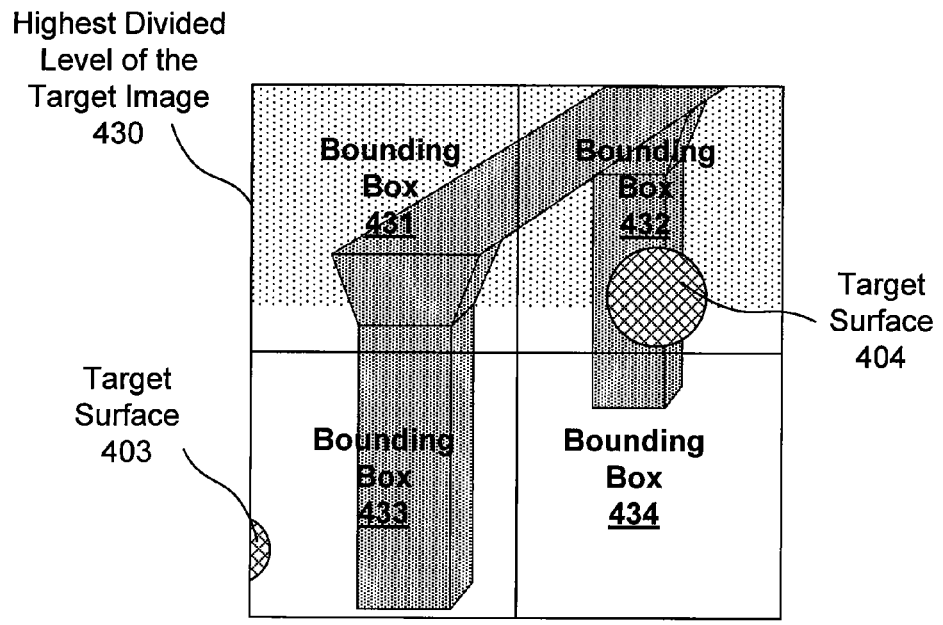
FIG. 4E is a diagram illustrating the target image shown in FIG. 4B divided into a first level of bounding boxes, according to one embodiment of the invention.

FIG. 4E is a diagram illustrating the target image shown in FIG. 4B divided into a first level of bounding boxes, according to one embodiment of the invention. Each bounding box 431-434 in the highest divided level of the target image 430 represents the union of the underlying bounding boxes of the divided level of the target image 410. More specifically, bounding box 431 is the union of bounding boxes 411, 412, 415, and 416. Bounding box 432 is the union of bounding boxes 413, 414, 417, and 418. Bounding box 433 is the union of bounding boxes 419, 420, 423, and 424. Bounding box 434 is the union of bounding boxes 421, 422, 425, and 426.

The tree structure is constructed using the difference information, e.g., vector (or warp) field V. Tree nodes are generated from the bottom level up. In a first pass, a bottom-level tree node is generated for each pixel, containing the reprojected posision of each pixel. In subsequent reductions, the number of tree nodes is reduced by a factor of four, i.e., each node is constructed from its four underlying children.

Figure 4F:
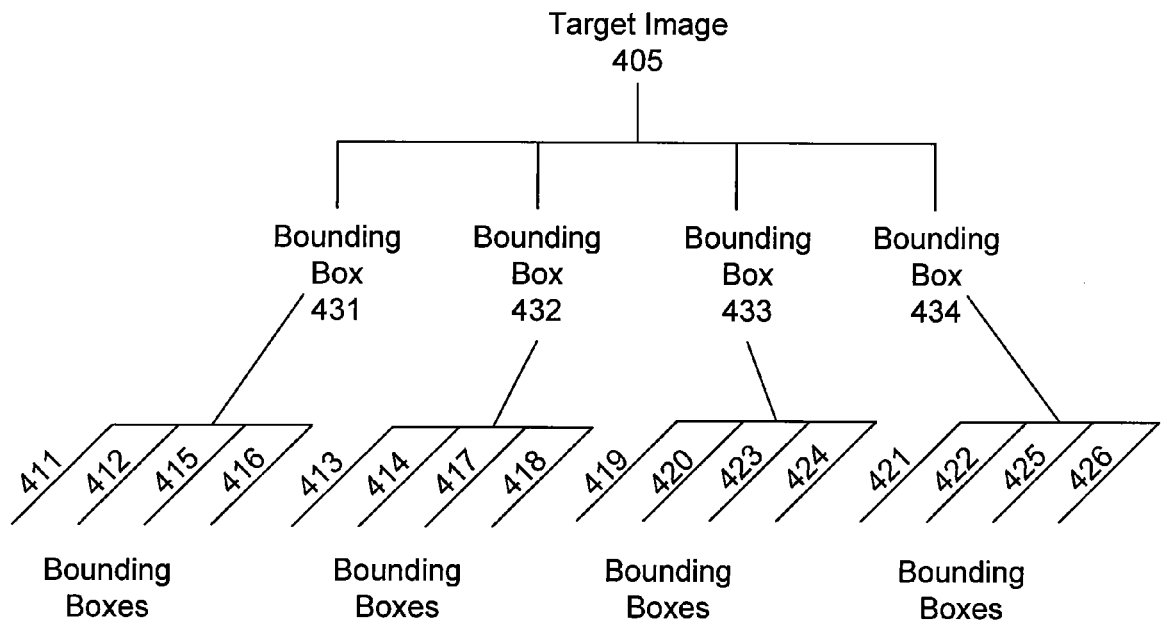
FIG. 4F is a diagram illustrating a hierarchy of bounding box levels for the target image shown in FIG. 4B, according to one embodiment of the invention.

A pixel shader may identify the region of the source image 400 that reprojects to a pixel in the target image 405 by performing bounding box intersections with each level of the bounding box hierarchy. FIG. 4F is a diagram illustrating a hierarchy of bounding box levels for the target image shown in FIG. 4B, according to one embodiment of the invention. Only the highest divided level of the target image 430 and the divided level of the target image 410 are shown in the tree structure. The tree structure includes additional levels (not shown) until the lowest divided level of the target image 408 is reached. The pixel shader may follow the tree hierarchy down to the source pixel corresponding to a target pixel to determine each starting source pixel that in order to generate the target image data. However, walking the entire tree hierarchy for every target pixel is not optimal and does not take advantage of the fast convergence of the fixed point iteration.

Traversal of the tree structure at a tree node n for a particular target pixel $x_w$ consists of performing bounding box intersections with each child $n_c$ of n. If the bounding box corresponding to $n_c$ intersects with $x_w$, the process is repeated recursively on $n_c$. In this manner a processing thread drills down to each surface in the source region that reprojects to $x_w$. If the region of the source image R represented by the current node n is entirely convergent, i.e., a convergence term is less than one at all points underneath the node, then traversal can be terminated and fixed point iteration may then be used to resolve the exact intersection, using any point R as the initial value $x_0$. For this purpose, a max-reduction may be performed on the values of the convergence terms during tree construction.

The fixed point iteration generally converges when the magnitude of the derivative of the iterated function is less than one in the vicinity of the fixed point, where the fixed point is a point in the source image. The derivative is the rate of change of the motion paths or vectors or difference data. When the motion paths or vectors vary smoothly, the fixed point iteration converges. A well defined convergence condition exists for the function G (see equation 15), when G is defined over some interval R. For a one-dimensional fixed point iteration, G is Lipschitz continuous with Lipschitz constant L if $$|G'(x)| < L, \forall x \in R \qquad \text{(equation 17)}$$

In general, if there is a solution to equation 17 in R, and G is Lipschitz continuous in R with Lipschitz constant L<1, fixed point iteration will converge to this solution, provided that it is seeded with an initial value in R. This is a result of the Bachach fixed point theorem or contraction mapping theorem, which states that if G is a contraction mapping over some convex region R, then G will admit precisely one fixed point x in R, and fixed point iteration will converge to x.

A contraction mapping is a mapping from R to itself that satisfies the Lipschitz continuity condition with L<1, as detailed above. In this context, the result is used in a slightly different manner. A solution in R is tested directly, and if a solution exists and the Lipschitz continuity condition is satisfied, then G must be a contraction mapping over R, and convergence of the iteration to the solution is guaranteed.

In two or more dimensions, the analogous condition to that shown in equation 17 is:

$$\rho(G'(x)) < 1, \forall x \in R, \qquad \text{(equation 18)}$$

where G' is the Jacobian matrix of G and ρ denotes the spectral radius of G', e.g., the maximum modulus of the eigenvalues of the matrix. Although an analytic formula for computing the eigenvalues of G' exists for the two-dimensional case, this computation can be avoided by noting that $\rho(G') \leq \|G'\|$ for any matrix G' and any induced matrix norm. The matrix norm induced by the vector p-norms for p=1 (the taxicab norm) and p=∞ (the maximum norm) are particularly simple, corresponding to the maximum absolute column sum and maximum absolute row sum, respectively. When the latter is used:

$$\|G'\|_\infty = \max_{1 \leq i \leq n} \sum_{j=1}^{n} |G'_{ij}| \qquad \text{(equation 19)}$$

where n=2 for the two dimensional case.

Using the definition provided by equation 19, the location of boundaries between convergent regions in the source image may be determined by computing the Jacobian G' using discrete derivatives, and checking if the maximum norm is less than 1. Although in general the location of these boundaries depends on the difference data, for difference data corresponding to spatial and temporal reprojections, these boundaries typically lie along geometry edges, as pixels that share a geometric surface generally shift together in a smooth manner.

Referring back to FIG. 4E, in bounding boxes 431 and 434, the maximum convergence term is less than one. In other words, all of the underlying difference data, e.g., motion or displacement vectors, vary smoothly, and the fixed point iteration will converge. In bounding boxes 432 and 433 there are discontinuities or steep gradients in the underlying difference data, so more iterations may be needed to reach convergence or convergence may not be possible. Discontinuities may indicate disocclusion.

When traversing the tree hierarchy, intersections between a position of the pixel in the source image that corresponds to a reprojected pixel in the target image and the bounding boxes are identified. When an intersection is found and the maximum convergence term is less than one, the fixed point iteration converges. When an intersection is found and the maximum convergence term is not less than one, the tree hierarchy is traversed to a lower level. For example, a position of a pixel may intersect with the bounding box 432. Because the maximum convergence term in the bounding box 432 is not less than one, the bounding boxes underlying bounding box 432 are examined. As shown in FIG. 4D, bounding boxes 413, 414, 417, and 418 underlie bounding box 432. Assuming that the position of the pixel is within bounding box 418, the maximum convergence term is less than one, so the iteration converges for the pixel.

At the lowest divided level of the target image 408, as shown in FIG. 4C, some bounding boxes lie within the target surface 404. Bounding boxes within the center of the target surface 404 may converge since motion discontinuities do not exist within the center of the target surface 404 for gradual motion. However, at the edges of the target surface 404 there are motion discontinuities that may require additional iterations to resolve or may present an area of disocclusion.

Pixels within bounding boxes that have a maximum convergence term that is less than one will converge to a fixed point, regardless of the initial starting point (initial iteration value). Pixels within bounding boxes that have a maximum convergence term that is not less than one may converge with fewer iterations if the initial starting point is in a smooth region (not an area of discontinuity). In one embodiment, the initial starting point of the iteration is identified within the source image that is offset from the corresponding pixel in the target image according to the difference data. The initial starting point may be determined as an offset of the motion vector bounding box.

Figure 5A:
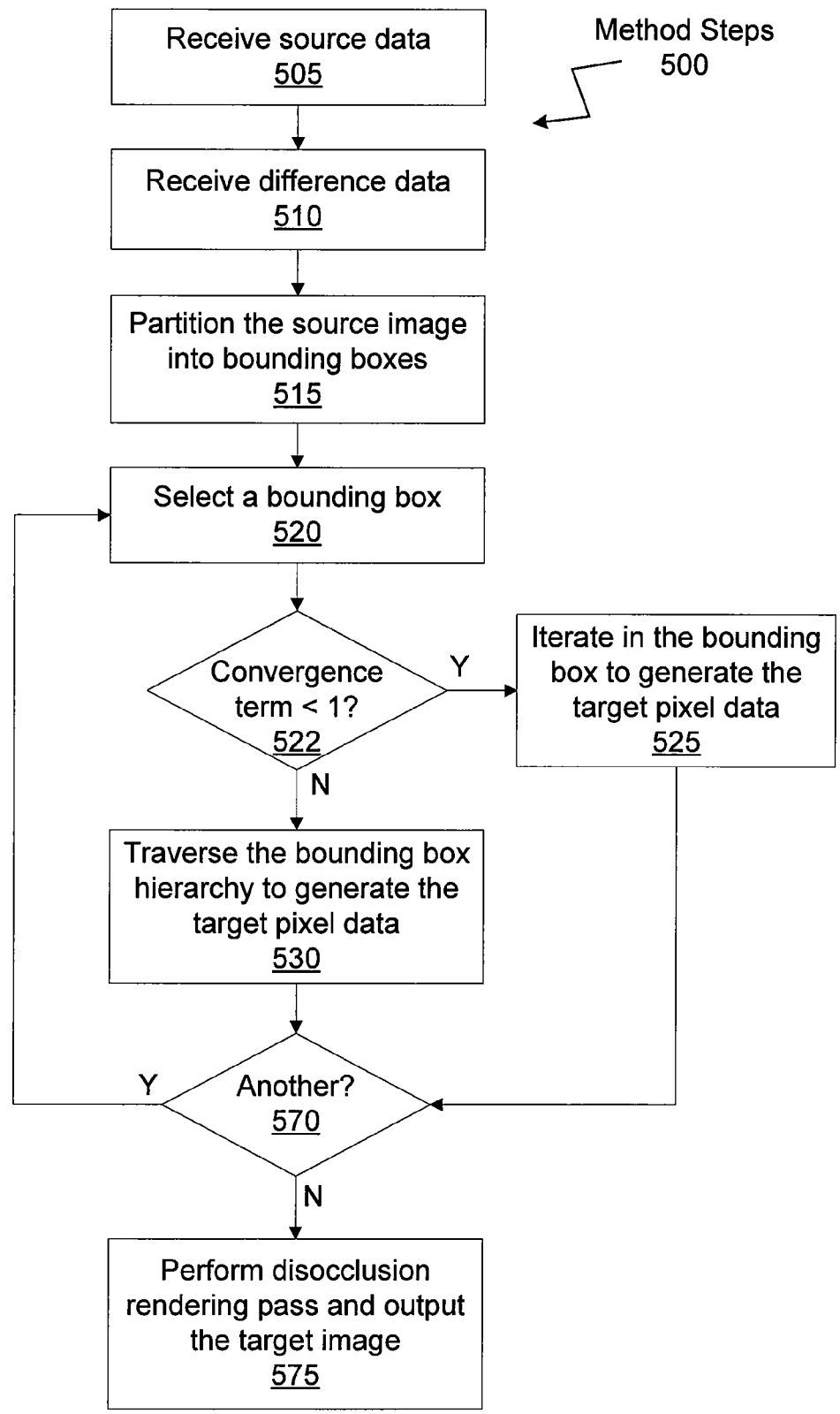
FIG. 5A is a flowchart of a method steps describing reprojection of a source image using adaptive traversal of a bounding box hierarchy to produce a target image, according to one embodiment of the invention.

FIG. 5A is a flowchart of a method steps describing reprojection of a source image using adaptive traversal of a bounding box hierarchy to produce a target image, according to one embodiment of the invention. Persons skilled in the art would understand that, even though the method is described in conjunction with the systems of FIGS. 1A-2C and 4A-4F, any system configured to perform the method steps, in any order, is within the scope of embodiments of the invention.

The method 500 begins at step 505, where a processing unit, such as the processing unit that executes the reprojection engine 128, receives the source image data 120. At step 510, the processing unit receives the difference data 124. At step 515, the source image is partitioned into bounding boxes and a bounding box hierarchy is constructed. The reprojection engine 128 may also compute the maximum convergence term for each bounding box in the hierarchy at step 515.

At step 520, a bounding box is selected and a particular starting point within the bounding box may be identified based on the difference data. At step 522, the reprojection engine 128 determines whether the maximum convergence term for the bounding box is less than one, and, if so, then, at step 525, the reprojection engine 128 iterates in the bounding box to generate the target pixel data. Otherwise, at step 530, the reprojection engine 128 traverses the bounding box hierarchy to generate the target pixel data, as further described in conjunction with FIG. 5B.

At step 570, the reprojection engine 128 determines whether data should be computed for another bounding box in the source image, and, if so, the reprojection engine 128 returns to step 520. Otherwise, at step 575, the target data has been generated and the pixel shader performs a rendering pass for disocclusion processing, after which the target image is complete and may be output by the pixel shader for display and/or stored.

Figure 5B:
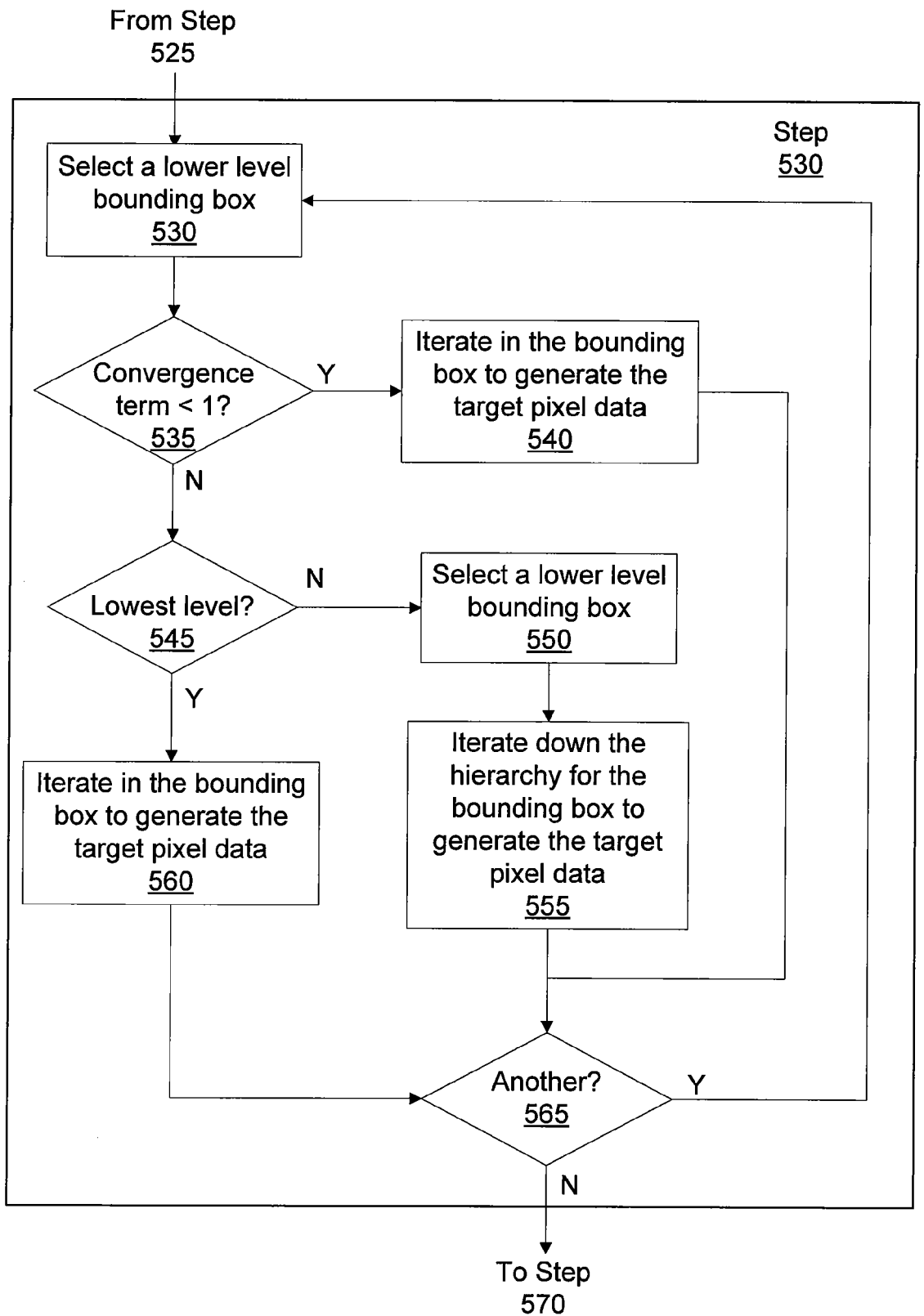
FIG. 5B is a flowchart of a method step shown in FIG. 5A, according to one embodiment of the invention.

FIG. 5B is a flowchart of the method step 530 shown in FIG. 5A, according to one embodiment of the invention. At step 530, the reprojection engine 128 selects a lower level bounding box. At step 535, the reprojection engine 128 determines whether the maximum convergence term for the bounding box is less than one, and, if so, then, at step 540, the reprojection engine 128 iterates in the bounding box to generate the target pixel data. Otherwise, at step 545, the reprojection engine 128 determines whether the lower level bounding box selected at step 530 is at the lowest level of the bounding box hierarchy. If the lowest level has not been reached, then, at step 550, a lower level bounding box is selected by the reprojection engine 128. At step 555, the reprojection engine 128 iterates down the hierarchy for the bounding box to generate the target pixel data.

If, at step 545, the reprojection engine 128 determines that the lowest level of the bounding box hierarchy has been reached, then, at step 560, the reprojection engine 128 iterates in the bounding box to generate the target pixel data. At step 565, the reprojection engine 128 determines whether another bounding box exists at the level, and, if so, the bounding box is processed by the reprojection engine 128. Otherwise, the reprojection engine 128 proceeds to step 570.

When a z (depth) value (z_converged) is computed for a reprojected pixel, a further optimization may be performed to produce high quality target images. In addition to storing the maximum convergence terms for each bounding box, the minimum depth values for bounding box may be stored in the bounding box hierarchy. The minimum depth value represents the minimum (nearest) depth of all surfaces represented by the bounding box, e.g., underlying surfaces. Lower level boxes are not traversed by the reprojection engine 128 when the minimum depth value is less than z_converged. Initially, z_converged equals z_far. After converging to a point on a surface at a particular depth, the (new) depth is compared with z_converged. When the (new) depth is less than (i.e., closer) than z_converged, the (new) depth replaces z_converged. Otherwise, the (new) depth is discarded.

In sum, the reprojection engine 128 may adaptively traverse the bounding box hierarchy based on the minimum z values and the maximum convergence terms. When a depth value, z_converged is computed, the reprojection engine 128 then walks back up the bounding box hierarchy, checking the remaining bounding boxes for intersections. When an intersection is found, and the corresponding minimum z value is less than the z_converged, the corresponding bounding box is traversed in search of a closer surface.

Figure 5C:
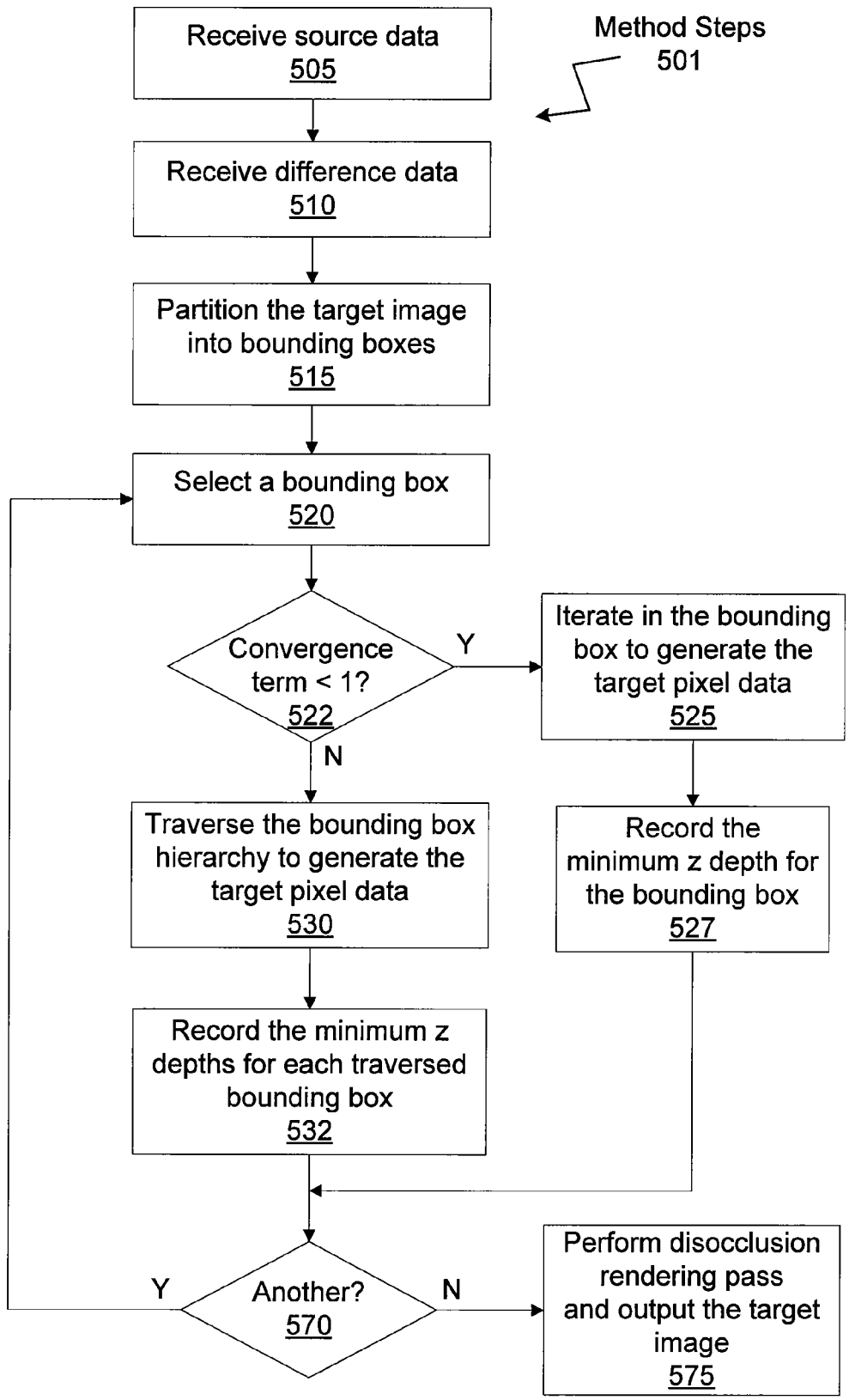
FIG. 5C is a flowchart of a method steps describing reprojection of a source image using adaptive traversal of a bounding box hierarchy and a depth order optimization to produce a target image, according to one embodiment of the invention.

FIG. 5C is a flowchart of a method steps 501 describing reprojection of a source image using adaptive traversal of a bounding box hierarchy and a depth order optimization to produce a target image, according to one embodiment of the invention. Persons skilled in the art would understand that, even though the method is described in conjunction with the system of FIGS. 1A-2C and 4A-4F, any system configured to perform the method steps, in any order, is within the scope of embodiments of the invention.

In one embodiment, steps 505, 510, 515, 520, 522, 525, 530, 570, and 575 are performed as previously described in conjunction with FIG. 5A. After each z_converged has been computed at step 525 for a bounding box, at step 527, the reprojection engine 128 records the minimum z depth for the bounding box. Similarly, following step 530, at step 532 the reprojection engine 128 also records the minimum z depth for the bounding box.

TABLE 2 illustrates pseudocode that may be used to perform image reprojection using a tree hierarchy (guidance tree).

TABLE 2

Image Reprojection Pseudocode

Procedure ReprojectImage (Point $x_w$, GuidanceTree t)
   begin
   // perform reprojection TABLE 2-continued Image Reprojection Pseudocode

```
        return TraverseTree(t.root, x_w, Z_FAR)
    end procedure
    procedure TraverseTree(Node n, Point x,
    Float z_converged)
    begin
        // check whether the source region reprojects
        to the target position
        // and that the region cannot be culled based
        on the previously
        // converged depth value
        if InBB(x, n, BB) and n, z_min < z_converged then
            if n.convergence_term < 1 then
                // convergence condition satisfied,
                switch to FP1
                Point x_0 ← n.source_region.center
                x ← FixedPointIteration(x,x_0)
                if x ≠ 0 then
                    depth ← Sample(SrcDepths, x)
                    if depth < z_converged then
                        return Sample(SrcImage, x)
                    end if
                end if
            else
                // drill down into node's children in
                depth-first fashion
                Color child_result, final_result ← 0
                For each child n_c of n do
                    child_result ← TraverseTree(n_c, x, z_converged)
                    if child_result ≠ 0 then
                        final_result ← child_result
                end for
                return final_result
            end if
        end if
    end procedure
```

Advantageously, the technique of using fixed point iteration may be used to reproject a source image and generate a high-quality target image in real-time. The fixed point iteration technique may also be used for offline rendering. A constant offset may be defined as the difference data to perform stereo reprojection. The difference data may be defined to perform other spatial reprojections and/or temporal reprojections. Additionally, disocclusion artifacts may be resolved through a final rendering pass that computes data for pixels identified during the fixed point iteration process. Performance of the reprojection technique may be improved by constructing and relying on guidance data that is in the form of a bounding box hierarchy. Since the bounding boxes tend to move linearly across a sequence of images, positions of the bounding boxes may be determined as trajectories instead of absolute positions. Relying on trajectories means that the bounding box hierarchy does not need to be reconstructed for each source image in the sequence of images. Maximum convergent terms and minimum depth values may be stored for each bounding box that allow the reprojection engine to adaptively traverse the bounding box hierarchy in order to generate the target data.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for reprojecting a source image, comprising:
receiving difference information representing a difference between the source image and a target image that is a reprojection of the source image;
dividing the target image into a set of bounding areas that each include endpoints of vectors that originate in the source image and represent the difference information; and
by a processor and for a starting point in the source image determined for at least one location in the target image based on the difference information for at least a first of the set of bounding areas, iterating a predefined function in order to generate target data for a respective location in the target image, including traversing the set of bounding areas based on a comparison between: (i) a depth value computed to represent the nearest depth value of surfaces in the first bounding area and (ii) a converged depth value computed for the at least one location in the target image.

2. The method of claim 1, further comprising performing a rendering pass to generate target data for disoccluded pixels.

3. The method of claim 1, wherein the predefined function is a fixed point function.

4. The method of claim 3, further comprising tagging a pixel in the target image that corresponds to a first location as a disoccluded pixel when the fixed point function does not converge for the first location in the source image.

5. The method of claim 1, wherein the difference information includes optical flow data indicating differences in positions of surfaces in the source image relative to positions of the surfaces in the target image.

6. The method of claim 1, wherein the target image and the source image form a stereographic image pair and the difference information is an offset distance in screenspace.

7. The method of claim 1, wherein the source image is a first frame in a sequence of frames including source images and target images, and the target image is a second frame in the sequence of frames.

8. The method of claim 7, wherein a frame rate of only the source images in the sequence of frames is a first frequency and a frame rate of the source images and the target images in the sequence of frames is a second frequency.

9. The method of claim 1, wherein the difference information represents a spatial difference in a viewpoint position corresponding to the source image and the target image.

10. The method of claim 1, wherein the difference information represents a temporal difference between the source image and the target image.

11. The method of claim 1, wherein the iterating of the predefined function comprises computing a threshold depth at which a relative parallax between two neighboring locations in the source image that are reprojected to the target image is insignificant.

12. The method of claim 11, further comprising generating data for a target location in the target image by shifting a corresponding source location in the source image when a reprojected depth value computed for the target location is not less than the threshold depth.

13. The method of claim 1, wherein the source image and the target image correspond to lightfields associated with different camera views.

14. A non-transitory computer-readable medium storing instructions that, when executed by a processor, cause a computer system to perform an operation for reprojecting a source image, the operation comprising:
- receiving difference information representing a difference between the source image and a target image that is a reprojection of the source image;
- dividing the target image into a set of bounding areas that each include endpoints of vectors that originate in the source image and represent the difference information; and
- by a processor and for a starting point in the source image determined for at least one location in the target image based on the difference information for at least a first of the set of bounding areas, iterating a predefined function in order to generate target data for a respective location in the target image, including traversing the set of bounding areas based on a comparison between: (i) a depth value computed to represent the nearest depth value of surfaces in the first bounding area and (ii) a converged depth value computed for the at least one location in the target image.

15. A system, comprising:
a processor; and
a memory storing a reprojection engine that is configured to perform an operation for reprojecting a source image, the operation comprising:
- receiving difference information representing a difference between the source image and a target image that is a reprojection of the source image;
- dividing the target image into a set of bounding areas that each include endpoints of vectors that originate in the source image and represent the difference information; and
- by a processor and for a starting point in the source image determined for at least one location in the target image based on the difference information for at least a first of the set of bounding areas, iterating a predefined function in order to generate target data for a respective location in the target image, including traversing the set of bounding areas based on a comparison between: (i) a depth value computed to represent the nearest depth value of surfaces in the first bounding area and (ii) a converged depth value computed for the at least one location in the target image.

16. A computer-implemented method of reprojecting a source image using guidance data, comprising:
- receiving source image data;
- receiving difference information representing an offset between the source image and a target image that is a reprojection of the source image;
- mapping the source image into a set of bounding areas that represent the guidance data;
- computing a convergence term based on the difference information for at least one of the bounding areas in the set of bounding areas;
- computing, for at least a first of the set of bounding areas, a depth value that represents the nearest depth value of surfaces in the first bounding area; and
- computing a converged depth value for a location in the target image, wherein the set of bounding areas is traversed based on a comparison between the converged depth value and the converged depth value in order to generate the target image.

17. The method of claim 16, wherein the set of bounding areas is a hierarchy with an increasing number of bounding areas at successively lower levels of the hierarchy.

18. The method of claim 16, further comprising, storing the set of bounding areas and a maximum convergence term in a memory.

19. The method of claim 16, wherein the difference information includes optical flow data indicating differences in positions of surfaces in the source image relative to positions of the surfaces in the target image.

20. The method of claim 16, wherein the target image and the source image form a stereographic image pair and the difference information is an offset distance in screenspace.

21. A non-transitory computer-readable medium storing instructions that, when executed by a processor, cause a computer system to perform an operation for reprojecting a source image using guidance data, the operation comprising:
- receiving source image data;
- receiving difference information representing a difference between the source image and a target image that is a reprojection of the source image;
- mapping the source image into a set of bounding areas that represent the guidance data;
- computing a convergence term based on the difference information for at least one of the bounding areas in the set of bounding areas;
- computing, for at least a first of the set of bounding areas, a depth value that represents the nearest depth value of surfaces in the first bounding area; and
- computing a converged depth value for a location in the target image, wherein the set of bounding areas is traversed based on a comparison between the converged depth value and the converged depth value in order to generate the target image.

22. The non-transitory computer-readable medium of claim 21, wherein the set of bounding areas is a hierarchy with an increasing number of bounding areas at successively lower levels of the hierarchy.

23. A system, comprising:
a processor; and
a memory storing a reprojection engine that is configured to perform an operation for reprojecting a source image using guidance data, the operation comprising:
- receiving source image data;
- receiving difference information representing a distance between the source image and a target image that is a reprojection of the source image;
- mapping the source image into a set of bounding areas that represent the guidance data;
- computing a convergence term based on the difference information for at least one of the bounding areas in the set of bounding areas;
- computing, for at least a first of the set of bounding areas, a depth value that represents the nearest depth value of surfaces in the first bounding area; and
- computing a converged depth value for a location in the target image, wherein the set of bounding areas is traversed based on a comparison between the converged depth value and the converged depth value in order to generate the target image.

24. The system of claim 23, wherein the set of bounding areas is a hierarchy with an increasing number of bounding areas at successively lower levels of the hierarchy.

25. A computer-implemented method of transmitting data to a receiving processor, comprising:
- transmitting a source image to the receiving processor; and
- transmitting difference information by a sending processor and representing a difference between the source image and a target image that is a reprojection of the source image to the receiving processor, wherein the receiving processor is configured to process the transmitted source image and difference information by:
  - dividing the target image into a set of bounding areas that each include endpoints of vectors that originate in the source image and represent the difference information; and
  - iterating, for a starting point in the source image determined for at least one location in the target image based on the difference information for at least a first of the set of bounding areas, a predefined function in order to generate target data for a respective location in the target image, including traversing the set of bounding areas based on a comparison between: (i) a depth value computed to represent the nearest depth value of surfaces in the first bounding area and (ii) a converged depth value computed for the at least one location in the target image.

26. A non-transitory computer-readable medium storing instructions that, when executed, cause a computer system to perform an operation for transmitting data to a receiving processor, the operation comprising:
- transmitting a source image to the receiving processor; and
- transmitting, by a sending processor when executing the instructions, difference information representing a difference between the source image and a target image that is a reprojection of the source image to the receiving processor;

wherein the receiving processor is configured to process the transmitted source image and difference information by:
- dividing the target image into a set of bounding areas that each include endpoints of vectors that originate in the source image and represent the difference information; and
- iterating, for a starting point in the source image determined for at least one location in the target image based on the difference information for at least a first of the set of bounding areas, a predefined function in order to generate target data for a respective location in the target image, including traversing the set of bounding areas based on a comparison between: (i) a depth value computed to represent the nearest depth value of surfaces in the first bounding area and (ii) a converged depth value computed for the at least one location in the target image.

27. The non-transitory computer-readable medium of claim 26, wherein the receiving processor is further configured to perform a rendering pass to generate target data for disoccluded pixels.

28. The non-transitory computer-readable medium of claim 26, wherein the predefined function is a fixed point function.

29. The non-transitory computer-readable medium of claim 26, wherein the source image and the target image correspond to lightfields associated with different camera views.

* * * * *